US012729274B2

(12) United States Patent
Qiu et al.

(10) Patent No.: US 12,729,274 B2
(45) Date of Patent: Sep. 8, 2026

(54) POLYROTAXANES AND METHODS OF MAKING AND USING THE SAME

(71) Applicant: Northwestern University, Evanston, IL (US)

(72) Inventors: Yunyan Qiu, Evanston, IL (US); James Fraser Stoddart, Evanston, IL (US)

(73) Assignee: Northwestern University, Evanston, IL (US)

(*) Notice: Subject to any disclaimer, the term of this patent is extended or adjusted under 35 U.S.C. 154(b) by 729 days.

(21) Appl. No.: 18/001,217

(22) PCT Filed: Jun. 8, 2021

(86) PCT No.: PCT/US2021/070674
§ 371 (c)(1),
(2) Date: Dec. 8, 2022

(87) PCT Pub. No.: WO2021/253039
PCT Pub. Date: Dec. 16, 2021

(65) Prior Publication Data

US 2023/0250240 A1 Aug. 10, 2023

Related U.S. Application Data

(60) Provisional application No. 63/036,106, filed on Jun. 8, 2020.

(51) Int. Cl.
*C08G 83/00* (2006.01)
*C08G 65/333* (2006.01)

(52) U.S. Cl.
CPC ..... *C08G 83/007* (2013.01); *C08G 65/33396* (2013.01)

(58) Field of Classification Search
CPC ........................ C08G 83/007; C08G 65/33396
See application file for complete search history.

(56) References Cited

U.S. PATENT DOCUMENTS

2017/0218135 A1 8/2017 Stoddart et al.

OTHER PUBLICATIONS

Stoddart (Angew. Chem. Int. Ed. 2017, 56, 11094-11125, 2017). (Year: 2017).*
Qiu et al ("A Molecular Dual Pump", J. Am. Chem. Soc. 2019, 141, 17472-17476). (Year: 2019).*
J. F. Stoddart, Mechanically interlocked molecules (MIMs)—molecular shuttles, switches, and machines (Nobel Lecture). Angew. Chem., Int. Ed. 56, 11094-11125 (2017).
C. Pezzato, C. Cheng, J. F. Stoddart, R. D. Astumian, Mastering the non-equilibrium assembly and operation of molecular machines. Chem. Soc. Rev. 46, 5491-5507 (2017).
(Continued)

*Primary Examiner* — Jiangtian Xu
(74) *Attorney, Agent, or Firm* — Quarles & Brady LLP

(57) ABSTRACT

Polyrotaxanes and methods of making and using the same are disclosed herein. The polyrotaxanes comprise a threading component comprising a collecting chain and at least one artificial molecular pump on the terminus of the TC. The artificial molecular pump comprises a coulombic barrier, a steric barrier, and a recognition site between the coulombic barrier and the steric barrier.

20 Claims, 11 Drawing Sheets

(56) References Cited

OTHER PUBLICATIONS

S. Erbas-Cakmak, D. A. Leigh, C. T. McTernan, A. L. Nussbaumer, Artificial molecular machines. Chem. Rev. 115, 10081-10206 (2015).
C. J. Bruns, J. F. Stoddart, The Nature of the Mechanical Bond: From Molecules to Machines (Wiley, 2016).
S. Mena-Hernando, E. M. Pérez, Mechanically interlocked materials. Rotaxanes and catenanes beyond the small molecule. Chem. Soc. Rev. 48, 5016-5032 (2019).
A. Harada, A. Hashidzume, H. Yamaguchi, Y. Takashima, Polymeric rotaxanes. Chem. Rev. 109, 5974-6023 (2009).
M. Arunachalam, H. W. Gibson, Recent developments in polypseudorotaxanes and polyrotaxanes. Prog. Polym. Sci. 39, 1043-1073 (2014).
Z. Niu, H. W. Gibson, Polycatenanes. Chem. Rev. 109, 6024-6046 (2009).
Q. Wu, P. M. Rauscher, X. Lang, R. J. Wojtecki, J. J. de Pablo, M. J. A. Hore, S. J. Rowan, Poly[n]catenanes: Synthesis of molecular interlocked chains. Science 358, 1434-1439 (2017).
Y. Noda, Y. Hayashi, K. Ito, From topological gels to slide-ring materials. J. Appl. Polym. Sci. 131, 40509 (2014).
S. Choi, T.-w. Kwon, A. Coskun, J. W. Choi, Highly elastic binders integrating polyrotaxanes for silicon microparticle anodes in lithium ion batteries. Science 357, 279-283 (2017).
K. K. Coti, M. E. Belowich, M. Liong, M. W. Ambrogio, Y. A. Lau, H. A. Khatib, J. I. Zink, N. M. Khashab, J. F. Stoddart, Mechanised nanoparticles for drug delivery. Nanoscale 1, 16-39 (2009).
X. J. Loh, Supramolecular host-guest polymeric materials for biomedical applications. Mater. Horiz. 1, 185-195 (2014).
F. M. Raymo, J. F. Stoddart, Interlocked macromolecules. Chem. Rev. 99, 1643-1664 (1999).
D. J. Cram, The design of molecular hosts, guests, and their complexes. Science 240, 760-767 (1988).
J.-M. Lehn, Toward self-organization and complex matter. Science 295, 2400-2403 (2002).
A. Harada, J. Li, M. Kamachi, The molecular necklace: a rotaxane containing many threaded α-cyclodextrins. Nature 356, 325-327 (1992).
A. B. C. Deutman, C. Monnereau, J. A. A. W. Elemans, G. Ercolani, R. J. M. Nolte, A. E. Rowan, Mechanism of threading a polymer through a macrocyclic ring. Science 322, 1668-1671 (2008).
F. M. Raymo, J. F. Stoddart, Polyrotaxanes and pseudopolyrotaxanes. Trends Polym. Sci. 4, 208-211 (1996).
P. R. Ashton, M. Bělohradský, D. Philp, J. F. Stoddart, Slippage—an alternative method for assembling [2]rotaxanes. J. Chem. Soc., Chem. Commun., 1269-1274 (1993).
J. Wu, K. C.-F. Leung, J. F. Stoddart, Efficient production of [n]rotaxanes by using template-directed clipping reactions. Proc. Natl. Acad. Sci. U. S. A. 104, 17266-17271 (2007).
M. E. Belowich, C. Valente, R. A. Smaldone, D. C. Friedman, J. Thiel, L. Cronin, J. F. Stoddart, Positive cooperativity in the template-directed synthesis of monodisperse macromolecules. J. Am. Chem. Soc. 134, 5243-5261 (2012).
N. Momčilović, P. G. Clark, A. J. Boydston, R. H. Grubbs, One-pot synthesis of polyrotaxanes via acyclic diene metathesis polymerization of supramolecular monomers. J. Am. Chem. Soc. 133, 19087-19089 (2011).
S. Kang, M. M. Cetin, R. Jiang, E. S. Clevenger, M. F. Mayer, Synthesis of metalated pseudorotaxane polymers with full control over the average linear density of threaded macrocycles. J. Am. Chem. Soc. 136, 12588-12591 (2014).
M. D. Cornelissen, S. Pilon, L. Steemers, M. J. Wanner, S. Frölke, E. Zuidinga, S. I. Jørgensen, J. I. van der Vlugt, J. H. van Maarseveen, A Covalent and modular synthesis of homo- and hetero[n]rotaxanes. J. Org. Chem. 85, 3146-3159 (2020).
J. E. M. Lewis, J. Winn, L. Cera, S. M. Goldup, Iterative synthesis of oligo[n]rotaxanes in excellent yield. J. Am. Chem. Soc. 138, 16329-16336 (2016).
K. Mayumi, K. Ito, K. Kato, Polyrotaxane and Slide-Ring Materials (RSC, 2016).
C. Cheng, P. R. McGonigal, S. T. Schneebeli, H. Li, N. A. Vermeulen, C. Ke, J. F. Stoddart, An artificial molecular pump. Nat. Nanotechnol. 10, 547-553 (2015).
C. Pezzato, M. T. Nguyen, C. Cheng, D. J. Kim, M. T. Otley, J. F. Stoddart, An efficient artificial molecular pump. Tetrahedron 73, 4849-4857 (2017).
Y. Qiu, L. Zhang, C. Pezzato, Y. Feng, W. Li, M. T. Nguyen, C. Cheng, D. Shen, Q.-H. Guo, Y. Shi, K. Cai, F. M. Alsubaie, R. D. Astumian, J. F. Stoddart, A molecular dual pump. J. Am. Chem. Soc. 141, 17472-17476 (2019).
R. D. Astumian, I. Derényi, Fluctuation driven transport and models of molecular motors and pumps. Eur. Biophys. J. 27, 474-489 (1998).
H. C. Kolb, M. G. Finn, K. B. Sharpless, Click chemistry: Diverse chemical function from a few good reactions. Angew. Chem., Int. Ed. 40, 2004-2021 (2001).
Y. Wang, M. Frasconi, J. F. Stoddart, Introducing stable radicals into molecular machines. ACS Cent. Sci. 3, 927-935 (2017).
C. Pezzato, M. T. Nguyen, D. J. Kim, O. Anamimoghadam, L. Mosca, J. F. Stoddart, Controlling dual molecular pumps electrochemically. Angew. Chem., Int. Ed. 57, 9325-9329 (2018).
J. C. Barnes, M. Juriček, N. A. Vermeulen, E. J. Dale, J. F. Stoddart, Synthesis of ExnBox cyclophanes. J. Org. Chem. 78, 11962-11969 (2013).
P. Thordarson, Determining association constants from titration experiments in supramolecular chemistry. Chem. Soc. Rev. 40, 1305-1323 (2011).
Qiu et al. A precise polyrotaxane synthesizer. Science. 2020;368(6496): 1247-1253.
International Search Report and Written Opinion, corresponding to PCT/US21/70674, dated Sep. 14, 2021.

* cited by examiner

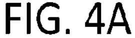
FIG. 4A
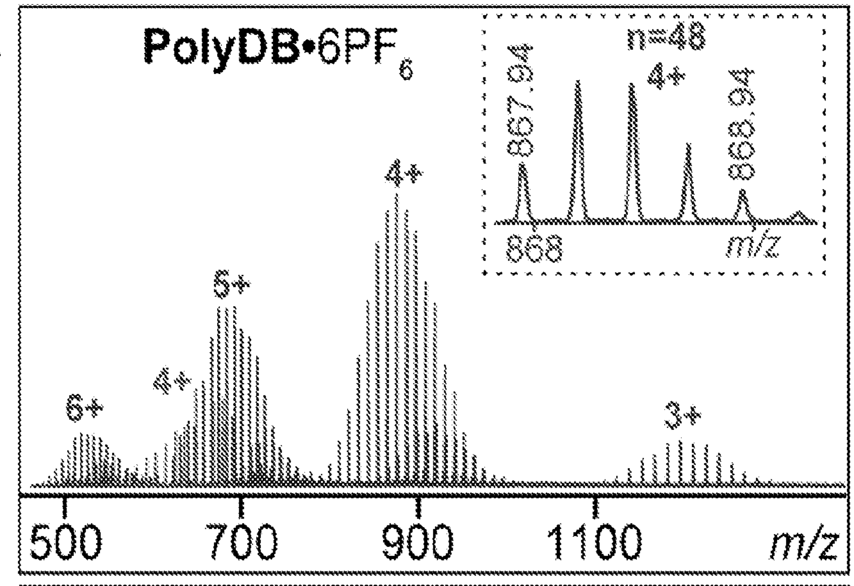
FIG. 4C
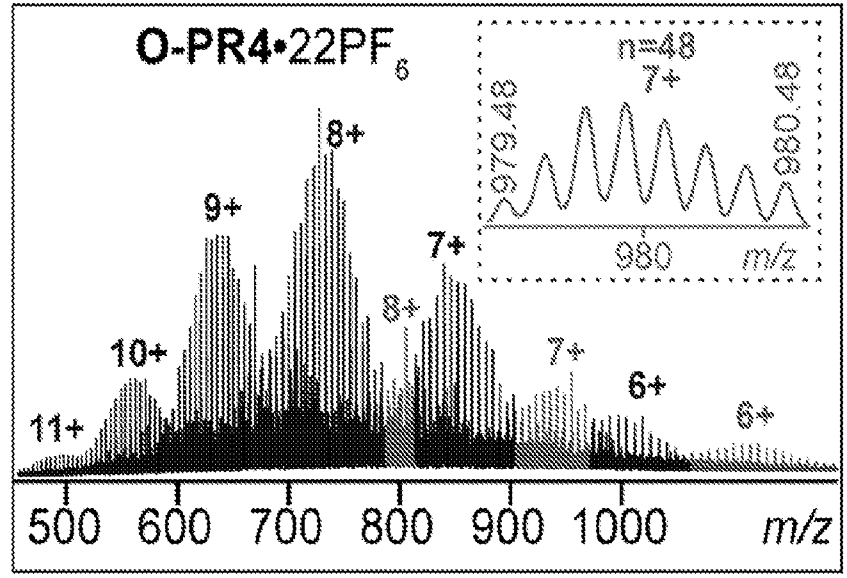
FIG. 4E
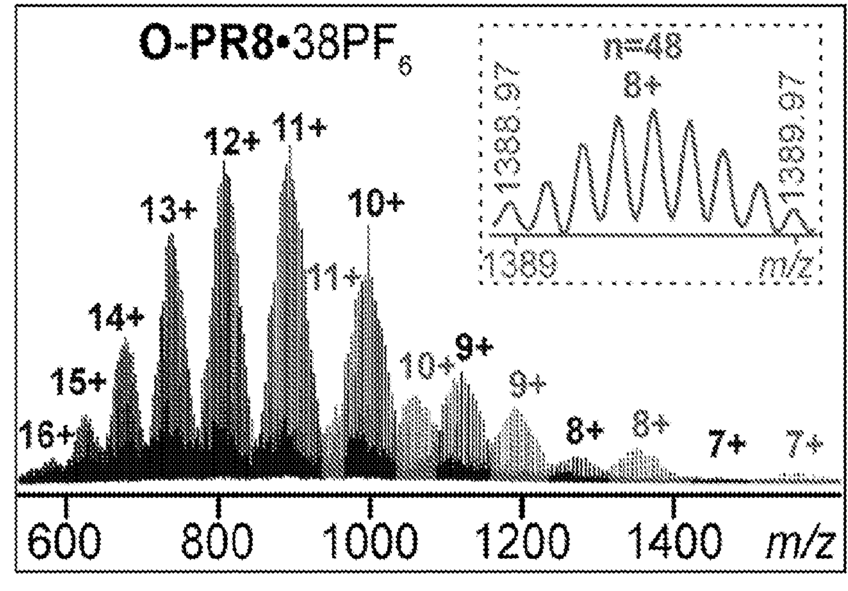

a
O-PR10•46PF6
−0.274 V
b
O-PR8•38PF6
−0.292 V
c
O-PR6•30PF6
−0.310 V
d
O-PR4•22PF6
−0.336 V

POLYROTAXANES AND METHODS OF MAKING AND USING THE SAME

CROSS-REFERENCE TO RELATED APPLICATIONS

This application represents the National Stage entry of PCT/US2021/070674 filed on Jun. 8, 2021, which claims the benefit of priority of U.S. Provisional Patent Application Ser. No. 63/036,106, filed on Jun. 8, 2020, the contents of each are incorporated by reference in their entireties.

BACKGROUND OF THE INVENTION

Although polyrotaxanes have already found niche applications in exotic materials with unique mechanical properties, efficient synthetic protocols to produce them with precise numbers of rings encircling their polymer dumbbells are still lacking. The burgeoning of mechanically interlocked molecules (MIMs) (1) has contributed to progress in the design and synthesis of artificial molecular machines (AMMs) (2, 3). The growing impact of the mechanical bond (4) on polymer chemistry and materials science, on the other hand, has led to the development of macroscopic soft materials with unique properties (5). Among these materials, mechanically interlocked polymers (MIPs), such as polyrotaxanes (6, 7) and polycatenanes (8, 9), with complex architectures and topologies, respectively, are desirable and yet challenging synthetic targets that permit access to applications in areas such as slide-ring gels (10), battery electrode materials (11), and drug delivery platforms (12, 13). These MIPs are usually prepared by template-directed protocols (14) which rely on molecular recognition (15) and self-assembly (16), depending upon the synergy between supramolecular chemistry and polymer science. One of the simplest and most general synthetic strategies for preparing polyrotaxanes, in particular, is the so-called "threading-followed-by-stoppering" approach (17), which takes advantage of noncovalent bonding interactions between polymeric axles and the threaded rings with a range of threading kinetics (18) to form pseudopolyrotaxanes (19), after which bulky stoppers can be connected covalently to both ends of the polymer chains to prevent the loss of the rings by slippage (20). The synthesis of polyrotaxanes involving poly(ethylene glycol) (PEG) and cyclodextrins (17), exploiting the hydrophobic effect in water, is perhaps the most representative case employing this strategy, affording slide-ring materials with remarkable physical properties (10) on account of their mobile ring components. Certain limitations, however, intrinsically associated with the nature of this synthetic approach appear to be evident, e.g., (i) restricted control over the number and density of threaded rings, and (ii) limited access to other types of polymer axles displaying weaker or no appreciable noncovalent bonding interactions with the rings.

Historically, oligo- and polyrotaxanes, with partial or restricted control over the numbers and densities of the rings, have been obtained by several approaches, such as template-directed clipping reactions (21, 22), dynamic acyclic diene metathesis polymerization (23), ring-opening olefin metathesis polymerization (24), covalent synthesis (25) and iterative active-template synthesis (26). These strategies can regulate, to differing extents, the numbers, densities and/or positions of the rings encircling oligo- and polymer axles, leading to enhanced control and distribution of the mobile rings, which serve as a crucial factor in determining and tuning the physical properties of these polyrotaxanes (27). Nevertheless, synthetic methodologies involving precise control over the numbers of rings threaded onto polymers that interact only weakly with the rings, are few and far between.

BRIEF SUMMARY OF THE INVENTION

Polyrotaxanes and methods of making and using the same are disclosed herein. The polyrotaxanes comprise a threading component comprising a collecting chain and at least one artificial molecular pump on the terminus of the TC. The artificial molecular pump comprises a Coulombic barrier (CB), a steric barrier (SB), and a recognition site (RS) between the CB and the SB. In some embodiments, the TC comprises two artificial molecular pumps one opposing termini of the TC. The polyrotaxanes further comprise at least two macrocyclic components (MCs) threaded onto the TC. In some embodiments, the threading component comprises

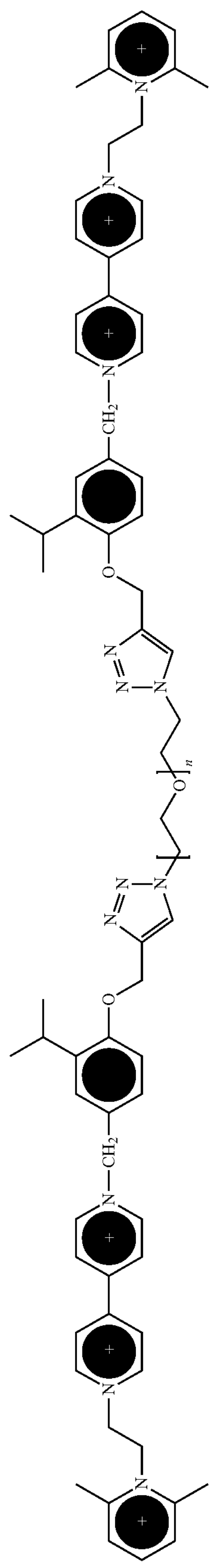

where n is an integer that indicates the number of repeating units that may be selected to determine the length of the collecting chain.

Another aspect of the invention is polyrotaxane comprising any of the threading components described herein and at least two macrocyclic components.

Another aspect of the invention is a method of preparing a polyrotaxane. The method comprises (a) providing a TC as described herein, (b) providing a MC as described herein, (c) reducing the TC and/or MC, (d) threading the TC with the MC, (e) oxidizing the TC and/or MC, (f) collecting the MC onto the CC, and (g) repeating steps (c)-(f) m redox cycles, where m is an integer greater than or equal to 1. In some embodiments, at least 2 MCs are threaded and/or collected each of the m+1 cycles. In some embodiments, the reducing step (c) comprises adding a reducing agent and/or the oxidizing step (e) comprises adding an oxidizing agent. In other embodiments, the reducing step (c) comprises applying a reducing potential and/or the oxidizing step (e) comprises applying an oxidizing potential. In some embodiments, the m+1 redox cycles are performed in a one-pot method. In other embodiments, the m+1 redox cycles are performed in a stepwise method.

These and other aspects of the invention will be further described herein.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention.

(FIG. 1A) Schematic representations of the structural formulas for the $CBPQT^{4+}$ ring and $PolyDB^{6+}$ which consists of two molecular pumps attached at both ends of the PEG chains through a pair of triazole rings, forming a collecting polymer chain located in the middle between the two pumps. The $PF_6^-$ counterions are omitted for the sake of clarity. A selected number of key protons on both $CBPQT^{4+}$ (Phen, $CH_2$, α, and β) and $PolyDB^{6+}$ (labels 6, 7, 8, 9 and 10) are labeled to aid the interpretation of $^1H$ NMR spectra reproduced in FIG. 3. (FIG. 1B) Schematic representation of the repetitive reduction and oxidation processes, either stepwise or in one-pot, producing a series of polyrotaxanes $PR2^{14+}$, $PR2^{22+}$, $PR6^{30+}$, $PR8^{38+}$ and $PR10^{46+}$ with 2, 4, 6, 8 and 10 rings, respectively.

(FIG. 2A) Graphical representations of the structural formulas for the $CBPQT^{4+}$ ring and $PolyDB^{6+}$ which consists of two molecular pumps attached at both ends of the PEG chains by a pair of triazole rings, forming a collecting polymer chain located in the middle between the two pumps. The $PF_6^-$ counterions are omitted for the sake of clarity. (FIG. 2B) The pumping mechanism for the redox-driven syntheses of the poly[5] rotaxane. Energy profiles representing the free energies of the system, as the rings are pumped in pairs onto the polymer dumbbell, are illustrated to the right of each intermediate in the reaction sequence. The curved arrows on the energy profiles represent reaction pathways that are either kinetically favored or disfavored. The triazole rings in each intermediate of the reaction are omitted for the sake of clarity. Initially, the rings and the polymer dumbbell repel (I) each other on account of strong Coulombic repulsions. Upon reduction, all $BIPY^{2+}$ units are reduced to their radical cationic states ($BIPY^{+\bullet}$), leading to the threading (II) of two $CBPQT^{2(+\bullet)}$ rings, one onto each end of $PolyDB^{4(+)2(\bullet)}$ with the formation of two trisradical tricationic complexes. On oxidation, the strong Coulombic repulsions between the charged $PY^+$, $BIPY^{2+}$ and $CBPQT^{4+}$ units force the rings to traverse (III) the IPP steric barriers and fall, as a result of thermal energy, into a kinetic trap provided by the polymer collecting chain, resulting in the formation (IV) of the poly[3]rotaxane. The second reduction allows the pumps to recruit (V) two more rings from the bulk solution following a similar mechanism. (In addition, the two threaded reduced rings most likely interact through radical-pairing interactions indicated by a pair of three vertical lines.) The second oxidation restores full charges to the $BIPY^{2+}$ units and the $CBPQT^{4+}$ rings and forces the second pair of rings to traverse (VI) the IPP steric barriers while the two re-oxidized threaded rings are prevented from de-threading by these steric barriers, aided and abetted by the strong Coulombic repulsions associated with both pumps. The second thermal relaxation results in the formation (VII) of the poly[5]rotaxane and so on.

(FIG. 3A) Partial $^1H$ NMR spectrum (600 MHz, $CD_3CN$, 298 K) of O-$PR2^{14+}$. (FIG. 3B) Partial $^1H$ NMR spectrum (600 MHz, $CD_3CN$, 298 K) of O-$PR2^{22+}$. (FIG. 3C) Partial $^1H$ NMR spectrum (600 MHz, $CD_3CN$, 298 K) of O-$PR6^{30+}$. (FIG. 3D) Partial $^1H$ NMR spectrum (600 MHz, $CD_3CN$, 298 K) of O-$PR8^{38+}$. (FIG. 3E) Partial $^1H$ NMR spectrum (600 MHz, $CD_3CN$, 298 K) of O-$PR10^{46+}$. The numbers in the brackets represent the expected integration values of the proton resonances of interest and the numbers under the peaks represent the actual integrated values. Primes represent the proton resonances of mechanically interlocked molecules.

FIGS. 4A-4F show an electrospray ionization-mass spectra (ESI-MS) of PolyDB·$6PF_6$ and all five poly[n]rotaxanes. (FIG. 4A) ESI-MS for PolyDB·$6PF_6$. The insets in the dashed box show the isotope pattern for $[(PolyDB)\cdot 2PF_6]^{4+}$ with 48 repeating ethylene glycol units. ESI-MS full spectra for O-PR2·$14PF_6$, (FIG. 4B)O-PR4·$22PF_6$ (FIG. 4C), O-PR6·$30PF_6$ (FIG. 4D), O-PR8·$38PF_6$ (FIG. 4E), and O-PR10·$46PF_6$ (FIG. 4F). The insets in the dashed boxes show the isotope pattern for $[(O\text{-}PR2)^*\cdot 7PF_6]^{7+}$, $[(O\text{-}PR4)^*\cdot 15PF_6]^{7+}$, $[(O\text{-}PR6)^*\cdot 22PF_6]^{8+}$, $[(O\text{-}PR8)^*\cdot 30PF_6]^{8+}$, and $[(O\text{-}PR10)^*\cdot 37PF_6]^{9+}$, respectively, with their corresponding charge states. The asterisk represents fragmentation at one end. The differences of these charge states in each spectrum result from the losses of different numbers of counterions ($PF_6$"), and the distributions in charge states derive from PEG with the different numbers of repeating units.

DETAILED DESCRIPTION OF THE INVENTION

Figure 1A:
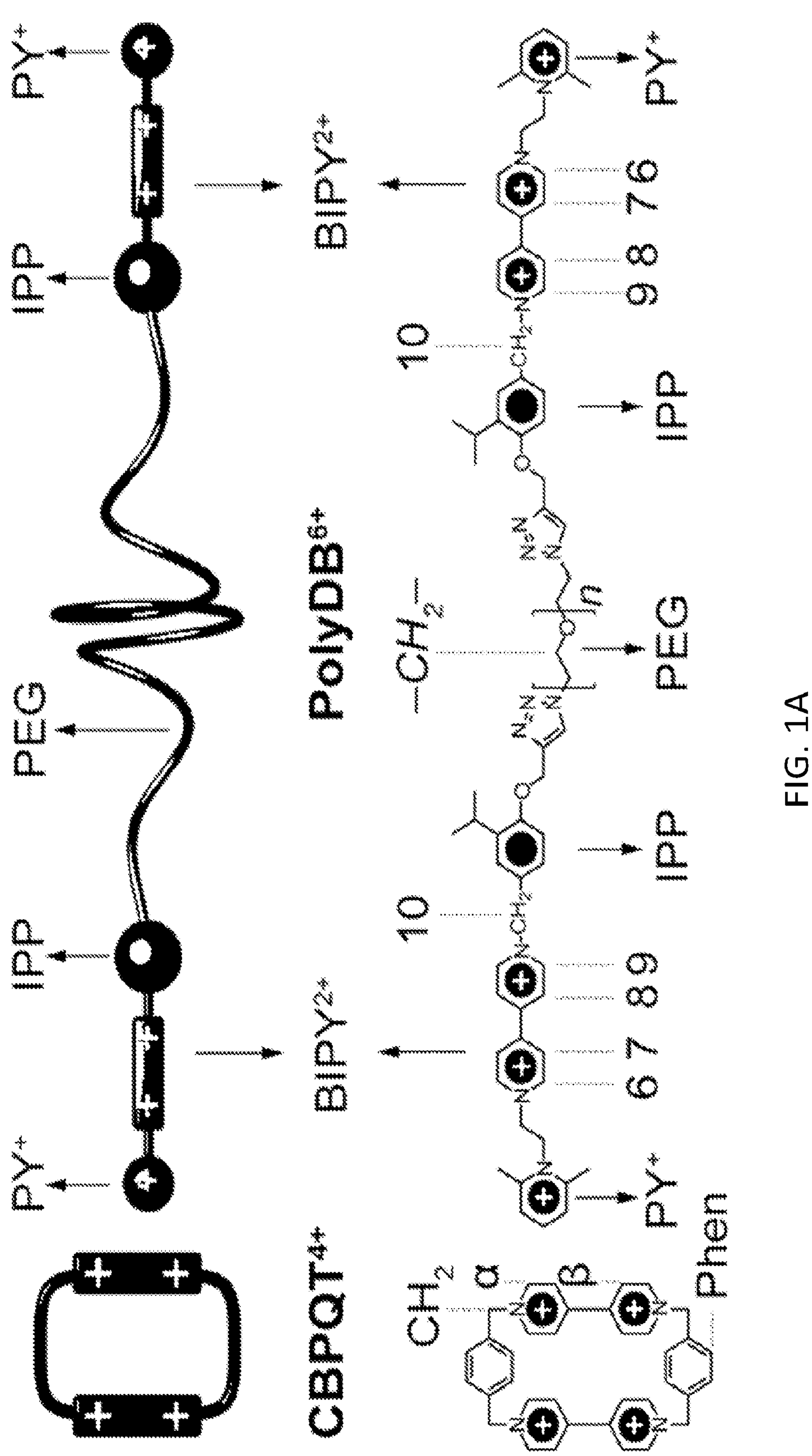
FIGS. 1A-1B show a graphical representations of the structural formulas for the $CBPQT^{4+}$ ring and $PolyDB^{6+}$, and the redox-driven syntheses of poly[n]rotaxanes employing AMPs.

Here, we report the assembly line-like emergence of higher and higher energy poly[n]rotaxanes, by harnessing artificial molecular pumps to controllably deliver rings by dint of cyclical redox-driven processes. This programmable strategy leads to the precise incorporation macrocyclic rings sequentially onto polymer chains, give rise to MIPs with flawless control over the numbers of mechanical bonds. Importantly, the formation of the MIP can be independent of the nature of the chosen polymer dumbbells as a result of the high operational reliability of AMMs.

The synthetic strategy disclosed herein relies on a redox-driven artificial molecular pump (AMP). AMPs may be used to recruit macrocyclic components from bulk solution onto relatively short oligomeric collecting chains, thus resulting in the production of MIMs away from equilibrium. Controlling the oxidation state of the AMP or threading component comprising the AMP allows one to reliably control the thermodynamics and allowing for the precise incorporation of the desired number of macrocyclic components irrespective of the polymer collecting chain.

The robustness and reliability of the disclosed methods is demonstrated in the preparation of a series of polyrotaxanes prepared using redox-driven artificial molecular pumps composed of two, four, six, eight and ten rings carrying 8+, 16+, 24+, 32+ and 40+ charges, respectively, onto hexacationic polymer dumbbells. The number of rings incorporated in the MIP depends precisely on the number of redox cycles applied. Also demonstrated is that the incorporation of the rings may be chemically or electrochemically driven, demonstrating the precise synthesis of polyrotaxanes and control over the number of threaded rings is robust. Thus, the present technology allows for a precisely controlled synthetic protocol that harnesses AMMs in delivering rings.

Here, we report the precision synthesis of enthalpically and entropically demanding multi-cationic poly[n]rotaxanes. "Rotaxane" means a molecular assembly comprising at least one molecular component with a linear section threaded through at least one macrocyclic part of another or the same molecular component, and having end-groups capable of preventing dethreading of the macrocyclic component via thermodynamic or kinetic trapping of the macrocyclic component. A "polyrotaxane" is a polymer composed of macromolecules that are macromolecular rotaxanes. When describing a rotaxane, the number n indicates the total number of independent components of the rotaxane, i.e., n=t+m where t is the total number of TCs and m is the total number of macrocyclic components. Suitably, n may be greater than or equal to 2, 3, 4, 5, 6, 7, 8, 9, 10, 11, 12, 13, 14, 15, 16, 17, 18, 19, 20, or 21 or m may be greater than or equal to 1, 2, 3, 4, 5, 6, 7, 8, 9, 10, 11, 12, 13, 14, 15, 16, 17, 18, 19, or 20.

The polyrotaxane of the present invention comprises at least one artificial molecular pump (AMP). In some embodiments, the polyrotaxane comprises at least two AMPs. As used herein an AMP comprises a coulombic barrier (CB), a steric barrier (SB), and a recognition site (RS) positioned between the coulombic barrier and the steric barrier. In some embodiments, the CB comprises 2,6-dimethylpyridinium ($PY^+$), the SB comprises isopropylphenylene (IPP), the RS comprises bipyridinium ($BIPY^{2+}$), or any combination thereof. In a particular embodiment, the AMP comprises $PY^+$, IPP, and $BIPY^{2+}$.

"Recognition site" or "RS" means a part of the TC, at which a macrocyclic component of a rotaxane prefers to locate. A recognition site immobilizes a macrocyclic component on the basis of the host-guest noncovalent interactions typical of supramolecular chemistry. Suitably, the recognition site may be comprised of radical, ionic, polar, or hydrophobic groups. In some embodiments, the recognition site allows for radical pairing with the macrocyclic component. In contrast, the CB and SB demarcate a region in which a MC can more or less move freely. In some embodiments, the RS is a viologen subunit. "Viologen subunit" (V) means a subunit that is substituted or unubstitued 4,4'-bipyridine, such as $C_{10}H_8N_2$. Viologens include 4,4'-bipyridinium (BIPY) subunits.

"Coulombic barrier" or "CB" means a group capable of demarcating a region in which a MC can move freely and which present a thermodynamic or kinetic barrier to a MC that depends strongly on the redox state of the rotaxane. Suitably the CB may be a chemical group capable of being in an ionic or radical redox state. Exemplary CBs include substituted or unsubstituted herteroaryls, such as 2,6-dimethylpyridinium (PY) or 3,5-dimethylpyridinium.

The recognition site and Columbic barrier may be joined by a linking subunit. In some embodiments, the linking subunit is a trismethylene subunit or bismethylene subunit, but other linking subunits may also be selected. The linking subunit may be selected to alter the association constant Ka of radical recognition pairs.

"Steric barrier" means a group that group capable of demarcating a region in which a MC can move freely and which present a thermodynamic or kinetic barrier to a MC that is substantially independent of the redox state of the rotaxane. Suitably the SB may be a chemical group incapable of changing its ionic or radical redox state at potentials capable of inducing a change in the ionic or redox state of either or both of the RS and CB. Exemplary SBs include substituted aryls, such as isopropylphenylene (IPP).

The recognition site and steric barrier may be joined by a linking subunit. In some embodiments, the linking subunit is a trismethylene subunit, bismethylene subunit, or methylene, but other linking subunits may also be selected. The linking subunit may be selected to alter the association constant $K_a$ of radical recognition pairs.

"Threading component" (TC) means a molecule comprising at least one AMP and at least one collecting chain (CC) onto which at least one macrocyclic component is collected. In some embodiments, the treading component is capable of threading at least 2, 4, 6, 8, 10, or more macrocyclic components. In some contexts, threading component may be used synonymously with "dumbbell" or "axle."

A "collecting chain" or "CC" is a linear subchain. The CC may be suitably selected from a number of different groups, including alkyl or polyether chains (e.g., polyethylene glycol chains). In some embodiments, the CC is PEG, polystyrene (PS), poly(methyl acrylate) (PMA), poly (methyl methacrylate) (PMMA), or polylactide (PLA) but other CCs are possible for collecting the macrocyclic components The TC may comprise a CB, RS, SB, and CC. In some embodiments, the TC comprises two AMPs and a LS positioned between the two AMPs. In some embodiments, the TC may comprise a CB, RS, SB, CC, SB, RS, CB.

"Macrocyclic component" (MC) means a molecule that has at least one ring (cycle) large enough to allow it to be threaded onto a linear subchain of another molecule. Macrocyclic components include cyclobis(paraquat-p-phenylene)(CBPQT) in any of its possible redox states such as $CBPQT^{4+}$, $CBPQT^{•3+}$, or $CBPQT^{2(•+)}$.

From the energy point of view, the intrinsic free energy of a single macrocyclic component ring threaded on the collecting chain $[(G_{A_{ox}}(n=1) \approx G_{A_{red}}(n=1)]$ is much higher (due predominately to entropy) than a single macrocyclic component ring in the bulk solution, where the free energy can be expressed as a chemical potential $\mu_{MC}=RT\ \ln[MC]$ and depends on the concentration of macrocyclic component in solution. Hence, at equilibrium with a reasonable concentration of macrocyclic component, the number of threaded rings on the collecting chain will be very small under either oxidizing or reducing conditions, nearly zero.

The process of preparing polyrotaxanes proceeded by an energy ratchet mechanism. The energy of the electrostatic barriers due to the RS units and the CB groups $$(G^{\ddagger}_{CB,ox} \gg G^{\ddagger}_{CB,red}),$$

and of the radical pairing interactions forming trisradical tricationic complexes $(G_{I_{ox}} >> G_{I_{red}})$ depends strongly on the redox state of the system. The energy of the steric barriers as a result of the SB units is more or less independent of the redox state $$(G^{\ddagger}_{SB,ox} \approx G^{\ddagger}_{SB,red}).$$

Figure 5:
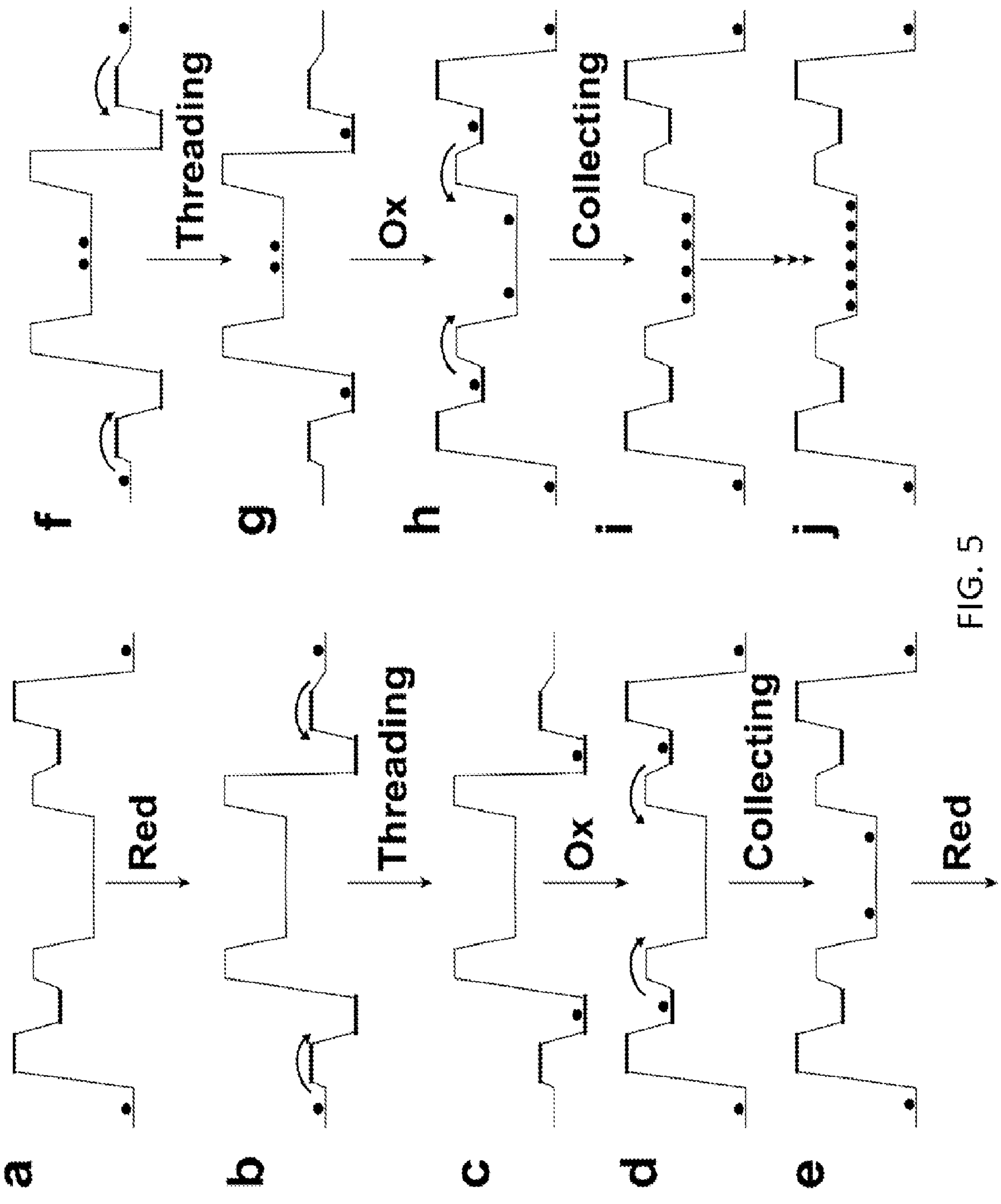
FIG. 5 shows detailed graphical representations describing the energetics of the pumping mechanism beginning with threading chain in its oxidized state (a) and involving the threading (c and g) of $CBPQT^{2(+\bullet)}$ rings onto the recognition sites ($BIPY^{+\bullet}$) and the collecting (e and i) of $CBPQT^{4+}$ rings on the polymer chains, upon reduction (b and f) and oxidation (d and h), respectively, forming a series of poly[n]rotaxanes resulting in a polyroxatane having a multiplicity of macrocyclic components (j).

The energy of the rings on the collecting chain increases as more and more rings are pumped onto the collecting chain $[G_{A_{ox}}(n=1)<G_{A_{ox}}(n=2)<G_{A_{ox}}(n=3)]$, but the magnitude of the energy increase with n can be relatively small if the collecting chain is extensible (long enough) as shown in FIG. 5. The redox state can be controlled either by sequentially adding reducing and oxidizing agents or by electricity. So far as the energy profiles go the method of controlling the redox state is of no consequence. Practically, however, there are important differences.

The energy input associated with each cycle due to changing the redox potential from reducing to oxidizing and back to reducing is twice the difference in free energy of the oxidized vs. reduced trisradical tricationic complexes $[2(G_{I_{ox}}-G_{I_{red}})]$, which is very large, which we estimate to be about 120 kcal/mol. If the energy barrier provided by the SB units is large enough $$(G^{\ddagger}_{SB,ox} \approx G^{\ddagger}_{SB,red} \gg RT),$$

the pump will continue to recruit rings from the bulk solution until the Coulombic energy of the threaded rings on the collecting chain is $G_{A_{ox}}(n)=G_{I_{ox}}-G_{I_{red}}$, which would make the passage of the rings over the SB units onto the collecting chain very slow upon oxidation. A more practical limit is provided by kinetics. The rings will continue to accumulate to a number n until the free energy of the oxidized MC rings on the RS units $(G_{I_{ox}})$ is equal the free energy of the oxidized MC ring on the collecting chain $[G_{A_{ox}}(n)]$, at which point it will be equally likely for the rings to remain located around the SB units as to move onto the collecting chain. At this value of n at which $G_{A_{ox}}(n)=G_{I_{ox}}$, adding additional rings to reach the final steady state which is governed by the expression $G_{A_{ox}}(n)=G_{I_{ox}}-G_{I_{red}}$ will become very slow.

Figure 1B:
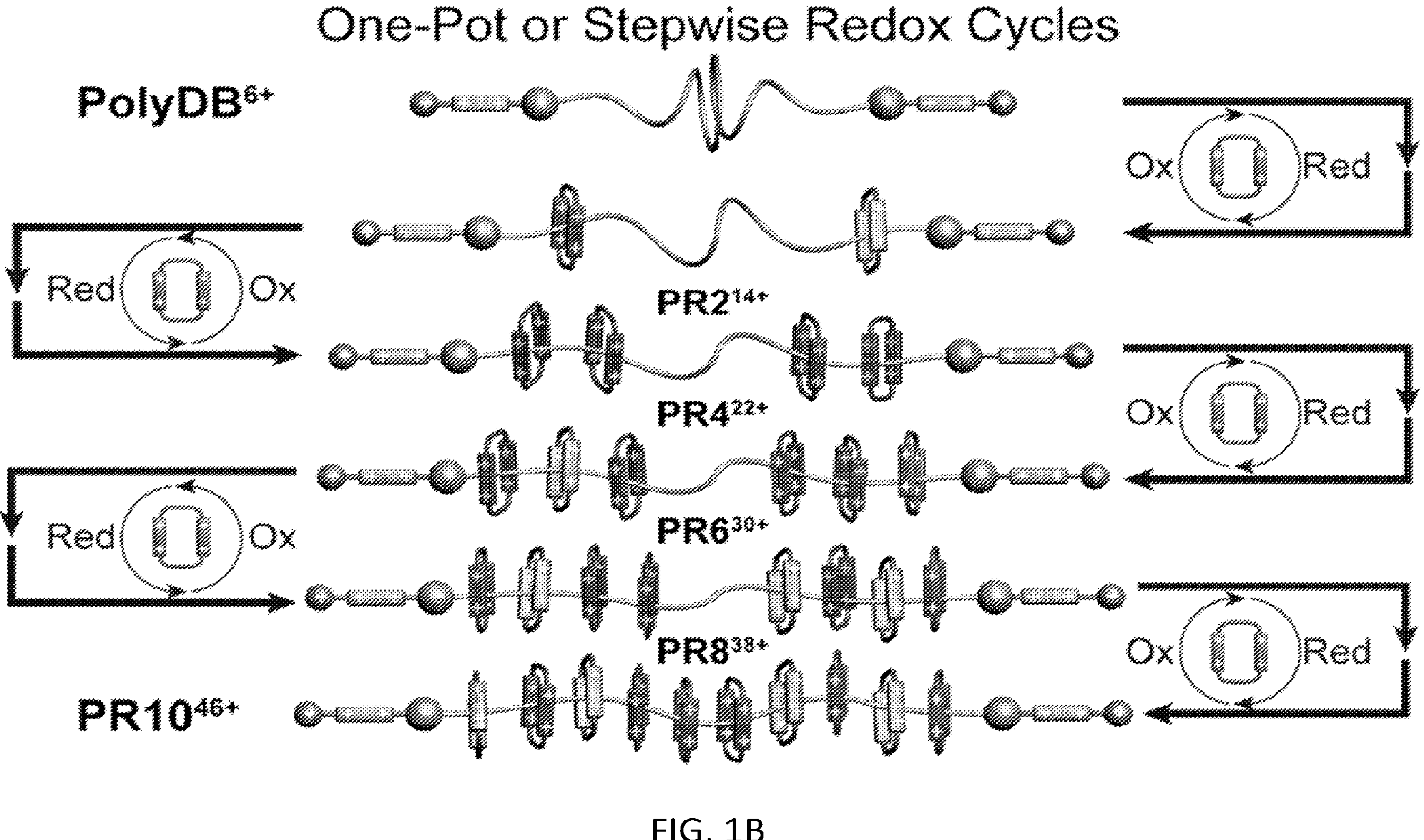

As demonstrated in the Examples, the polyrotaxanes may employ PEG as the polymer dumbbell and $CBPQT^{4+}$ as the threaded macrocyclic rings. PEG may be chosen because it displays no appreciable noncovalent bonding interactions with these rings. Complete control over the number of rings mechanically interlocked with individual polymer chain, has been realized through the incorporation (FIG. 1A) of two redox-operated AMPs (28), which are covalently attached to both ends of PEG. These polymer dumbbells can, therefore, serve as collecting chains with the flawless ability to accommodate multiple ring components sequentially. The pumping of these rings onto the polymer dumbbells is powered precisely by the redox-switching properties of the bipyridinium units associated with both the rings and the AMPs, employing an energy-ratchet mechanism. In this manner, two $CBPQT^{4+}$ rings can be pumped simultaneously onto the collecting polymer chains following each redox cycle. A defined number of rings (2, 4, 6, 8 and 10) can then be installed (FIG. 1B) onto the PEG axles depending solely on the number of redox cycles applied to both the AMP-functionalized polymer dumbbells and the $CBPQT^{4+}$ rings.

Figure 2A:
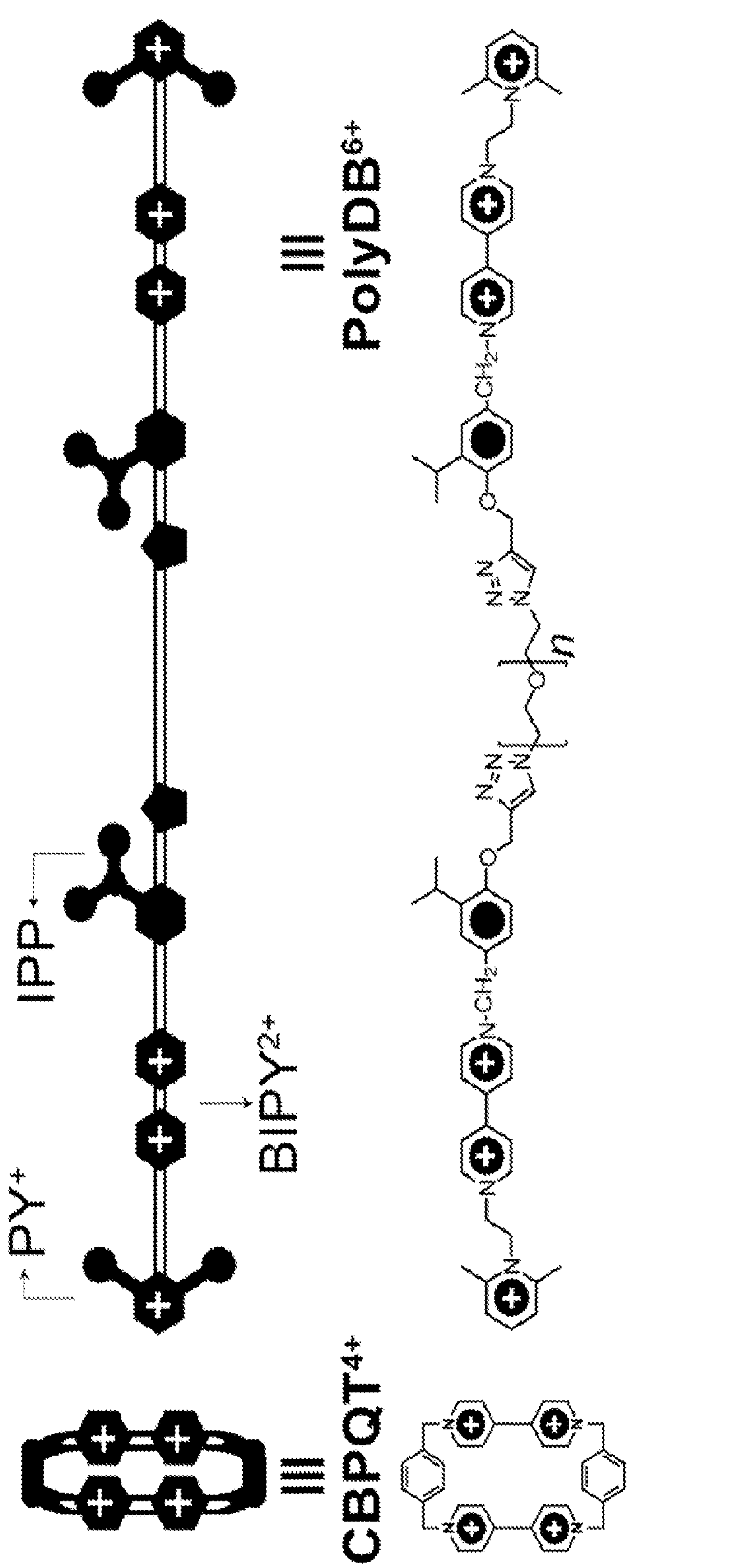
FIGS. 2A-2B show a graphical representations of the redox-driven syntheses of the poly[5]rotaxane, employing a flashing energy-ratchet mechanism.
Figure 2B:
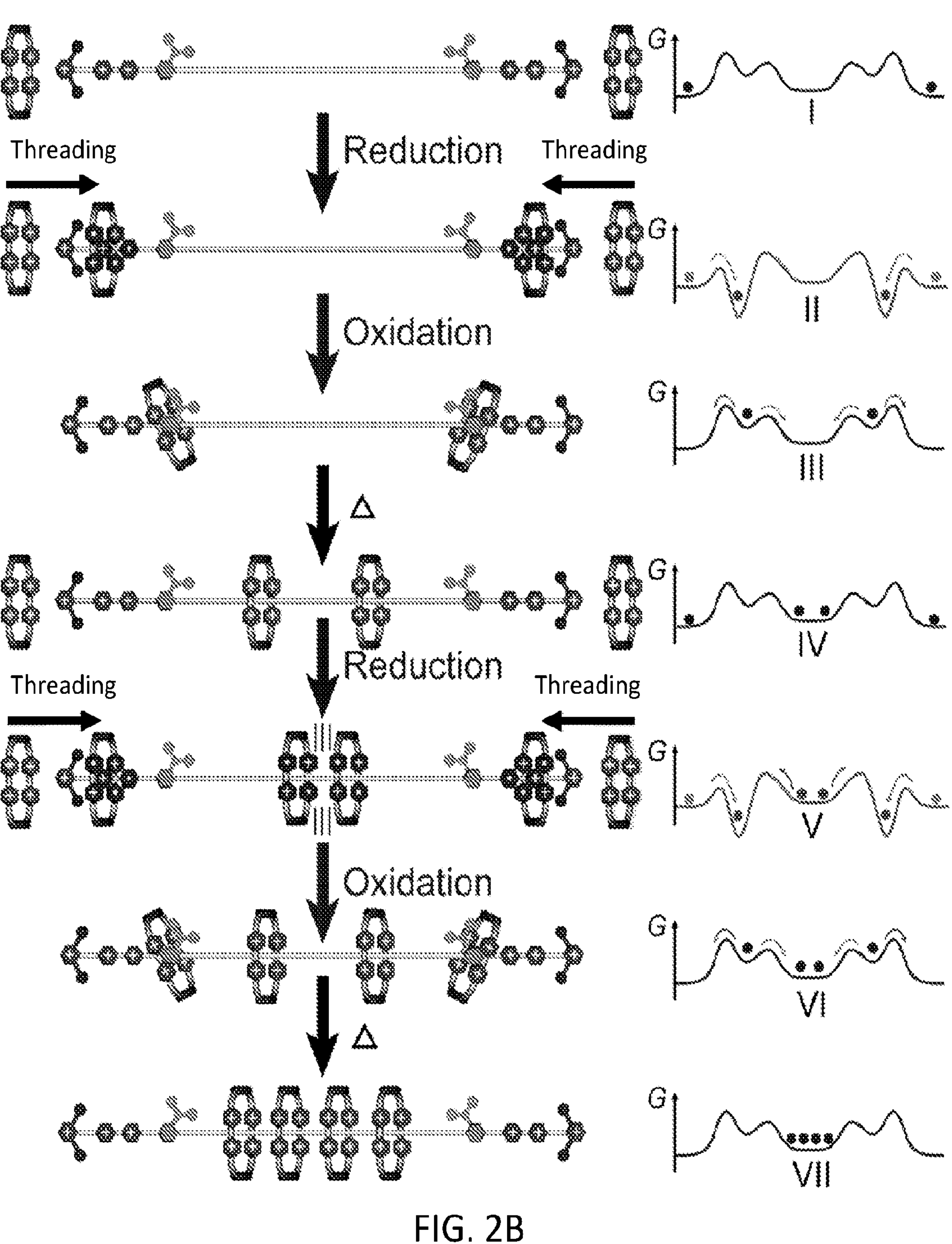

The polymer dumbbell $PolyDB^{6+}$ (FIG. 2A) incorporating two AMPs at both ends of the azide-terminated PEG ($M_n$=2000, Polydispersity=1.05) was synthesized (Scheme 1) using click chemistry (33) and has been characterized by $^1H$ nuclear magnetic resonance (NMR) spectroscopy. Considering the molecular weight ($M_n$=2000) of the chosen PEG, we can estimate no more than 17 rings can be pumped onto the polymer collecting chains based on an estimate that each ring can roughly occupy eight-carbon length of space on the collecting chain. The AMP consists (FIG. 2A) of a bipyridinium ($BIPY^{2+}$) unit positioned between a 2,6-dimethylpyridinium ($PY^+$) Coulombic barrier and an isopropylphenylene (IPP) steric barrier, which, taken as a trio, gives access to the formation of mechanical bonds with the $CBPQT^{4+}$ rings. The operation of the two-terminal AMPs relies on the redox-switching properties of $BIPY^{2+}$ units associated with both the molecular pumps and the rings. Upon reduction, all $BIPY^{2+}$ units are reduced to their radical cationic states, leading to the threading (FIG. 2B, Gibbs energy profile II) of $CBPQT^{2(+•)}$ rings onto $PolyDB^{4(+)2(•)}$, with the formation of trisradical tricationic complexes based on radical-radical interactions (34). After oxidation, the strong Coulombic repulsions between charged units force the rings to traverse (FIG. 2B, Gibbs energy profile III) the IPP units by exploiting the imbalance between the energy barriers exerted from the charged units ($PY^+$ and $BIPY^{2+}$) of the pumps and the IPP units, resulting in the formation (FIG. 2B, Gibbs energy profile IV) of the poly[3]rotaxane during thermal relaxation. A second redox cycle following an analogous mechanism produces (FIG. 2B, Gibbs energy profiles V, VI and VII) the poly[5]rotaxane and so on.

The polyrotaxane synthesizer is operated by an energy-ratchet mechanism (2, 31). The fundamental operation principle relies on the fact that the energy of the electrostatic barriers arising from the $PY^+$ and $BIPY^{2+}$ units and of the radical-pairing interactions forming trisradical tricationic complexes depends strongly on the redox state of the system, while the heights of the steric barriers imposed by the IPP units are independent (FIG. 2B) of the redox state. The resulting kinetic asymmetry (FIG. 5) allows the pumps to use the energy supplied by the alternating redox reagents or potentials to drive the formation of a highly non-equilibrium mechanically interlocked system. The Exampled demonstrated that a polyrotaxane with up to 10 rings threaded onto a collecting chain may be formed. Moreover the polyrotaxane that persists as a metastable state away-from-equilibrium for a long time.

Figures 3A, 3B, 3C:
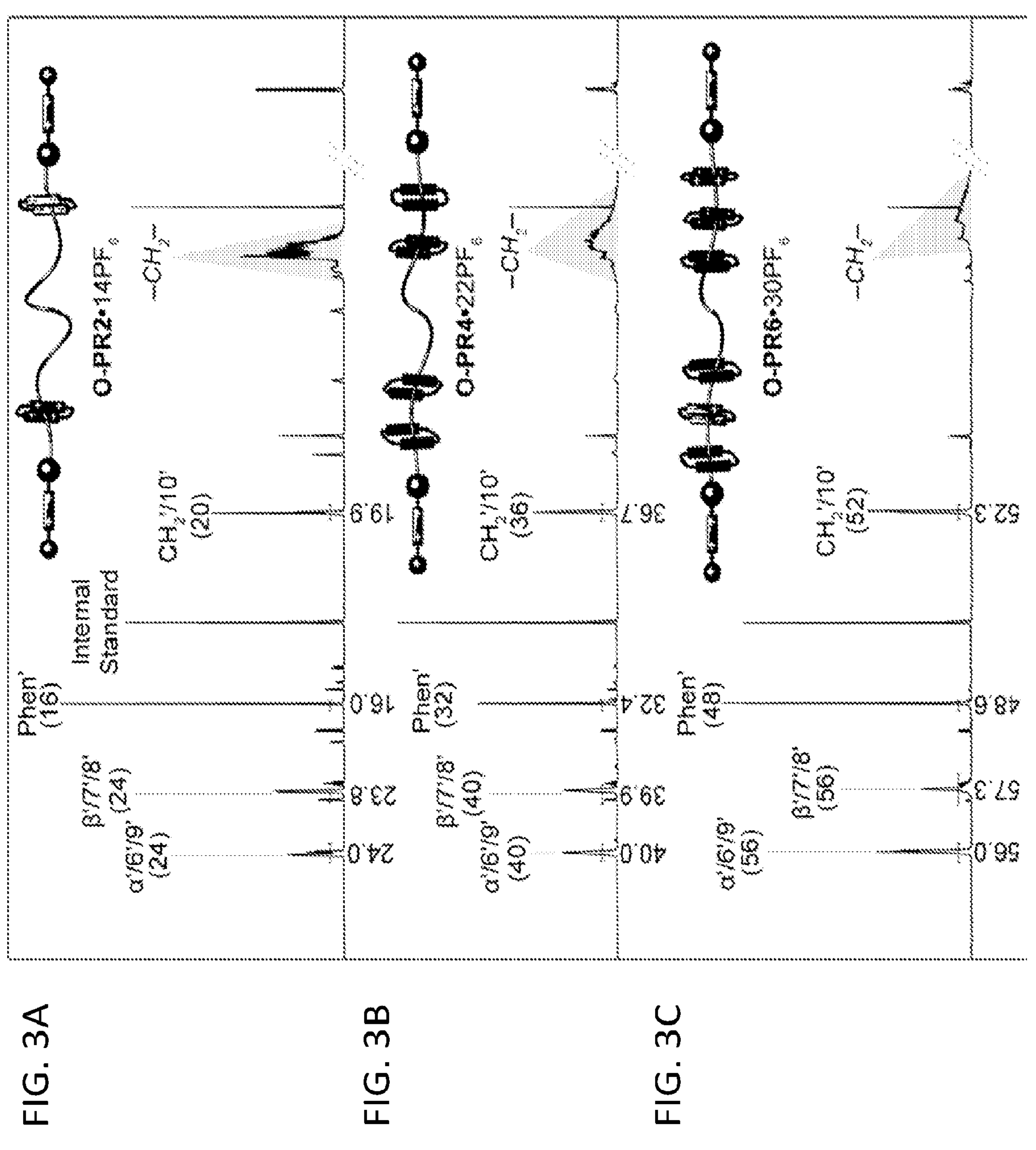
FIGS. 3A-3E show an NMR spectroscopic characterization of all five poly[n]rotaxanes.
Figures 3D, 3E:
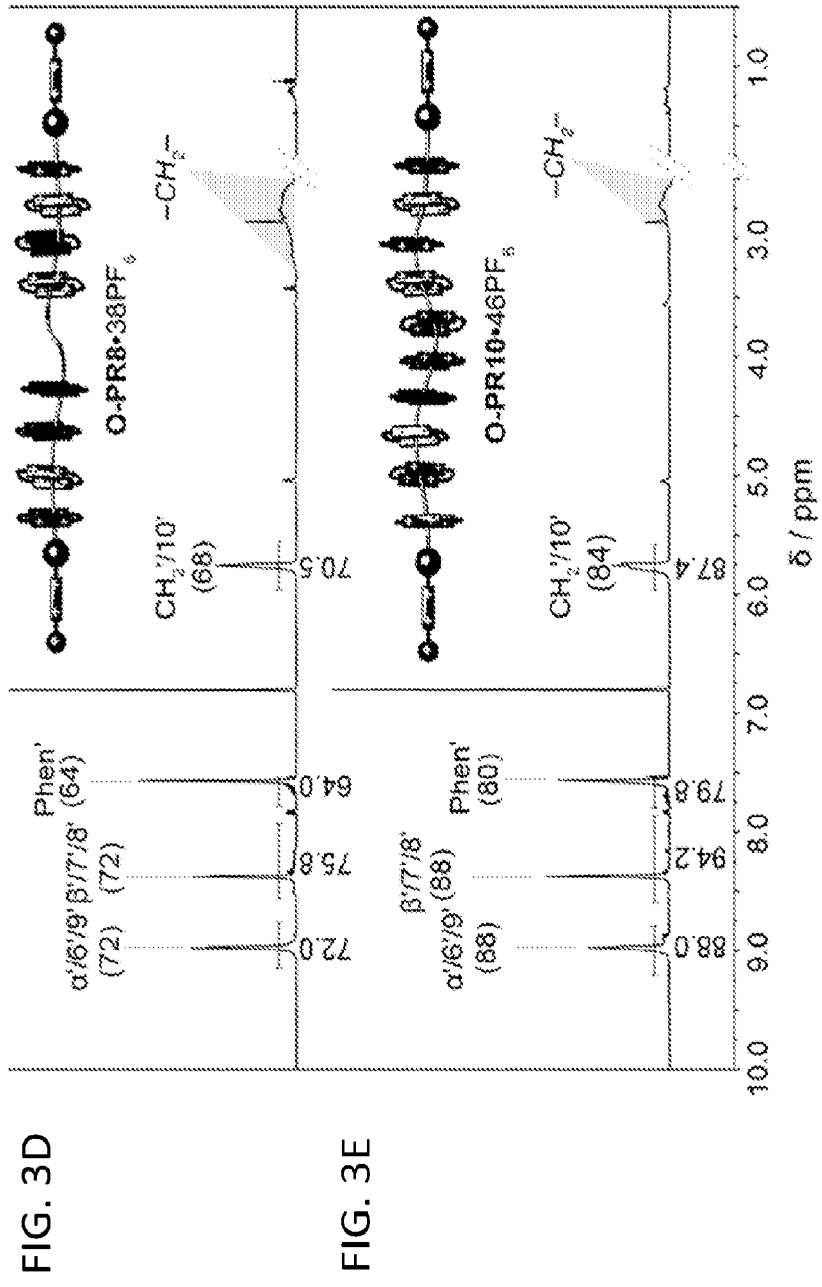

Firstly, we subjected $PolyDB^{6+}$ and a large excess of $CBPQT^{4+}$ to one cycle of redox reactions employing cobaltocene (reductant) and $NOPF_6$ (oxidant). A reduction time of 10 min with Zn powder is more than sufficient to power the molecular pump. Thus, the proceeding time for the reduction here is set to be 30 min in order to achieve exhaustive complexations of a pair of rings onto the pumps, as cobaltocene is a stronger reducing reagent than Zn. Subsequent $^1H$ NMR spectroscopic analysis confirmed the successful production of the poly[3]rotaxane S-$PR2^{14+}$ (S stands for stepwise) with the only two mechanically interlocked $CBPQT^{4+}$ rings, showing that both AMPs operate simultaneously. Motivated by this accomplishment, we decided to apply a stepwise synthetic strategy to the isolated poly[3]rotaxane S-$PR2^{14+}$ which was employed as the starting material, and subsequently generated the poly[5]rotaxane S-$PR2^{22+}$ with four $CBPQT^{4+}$ rings after a second redox cycle. A repeat of this redox cycle led to the poly[7]rotaxane S-$PR6^{30+}$ possessing six mechanically interlocked rings using S-$PR2^{22+}$ as the starting material. All three poly[n]rotaxanes have been characterized by $^1H$ NMR spectroscopy. The ease of the redox operation of the AMPs simply by the addition of redox reagents, as well as a relatively short operating time (within the hour) for each redox cycle also led us to the adoption of a one-pot synthetic strategy, which eliminates the tedious isolation of intermediate poly[n]rotaxane precursors. Accordingly, O-$PR2^{14+}$, O-$PR2^{22+}$ and O-$PR6^{30+}$ (O stands for one-pot) can be produced by subjecting $PolyDB^{6+}$ to one, two and three redox cycles, respectively, through the repetitive addition of reductant and oxidant alternatively into the reaction mixture. We then continued the redox cycle, producing the poly[9]rotaxane O-$PR8^{38+}$ and the poly[11]rotaxane O-$PR10^{46+}$ with corresponding numbers of eight and 10 rings, respectively. All these poly[n]rotaxanes, produced by one-pot redox cycles, have been characterized (FIGS. 3A-3E) quantitatively using $^1H$ NMR spectroscopy and $^1H$-$^1H$ correlation spectroscopy (COSY) with mesitylene as an internal standard. Integration of the resulting $^1H$ NMR spectra allows us to calculate the number average molecular weights ($M_n$) of the homologous series (Table 1) of these poly[n]rotaxanes. These calculated results are in fairly good agreement with the theoretical $M_n$. 2D Diffusion-ordered spectroscopic (DOSY) and nuclear Overhauser effect spectroscopic (NOESY) measurements were also employed in order to confirm the mechanically interlocked nature of the poly[n]rotaxanes (data not shown). It is clear from FIG. 3A to 3E that the resonances for the $—OCH_2CH_2—$repeating units in the PEG backbones undergo a continuous upfield shift with the increasing number of rings, on account of the amplification of the shielding effect exerted by the $CBPQT^{4+}$ rings. The number of the threaded rings can be estimated from the integration of probe resonances in the $^1H$ NMR spectra recorded in FIG. 3A-3E. The ratio of the rings to the polymer dumbbell is deduced from carrying out comparisons between the expected (numbers in brackets in FIG. 3A-3E) and the actual integration values (numbers under peaks in FIG. 3A-3E) of proton resonances present in both the mechanically interlocked $CBPQT^{4+}$ rings ($H_{\alpha'}$, $H_{\beta'}$, $H_{Phen'}$, and $H_{CH_2'}$) and the $PolyDB^{6+}$ components ($H_{6'}$, $H_{9'}$, $H_7$, $H_{8'}$ and $H_{10'}$). In all five cases, the actual integrated values of the proton resonances are in good agreement with the expected ones, thus indicating the successful threading of the rings onto $PolyDB^{6+}$ with the targeted number (2, 4, 6, 8 and 10). Among these $^1H$ NMR spectra, the spectra (FIGS. 3D and 3E) of O-$PR8^{38+}$ and O-$PR10^{46+}$ exhibit signal broadening on account of the increased number of threaded rings, resulting in small deviations between the expected and actual integrated values associated with the proton resonances for $H_{\beta'}/H_{7'}/H_{8'}$. These deviations have been mitigated after deconvolution to remove the integrations from irrelevant overlapping resonances, revealing excellent agreement between the actual integrated values and the expected ones.

Figure 4B:
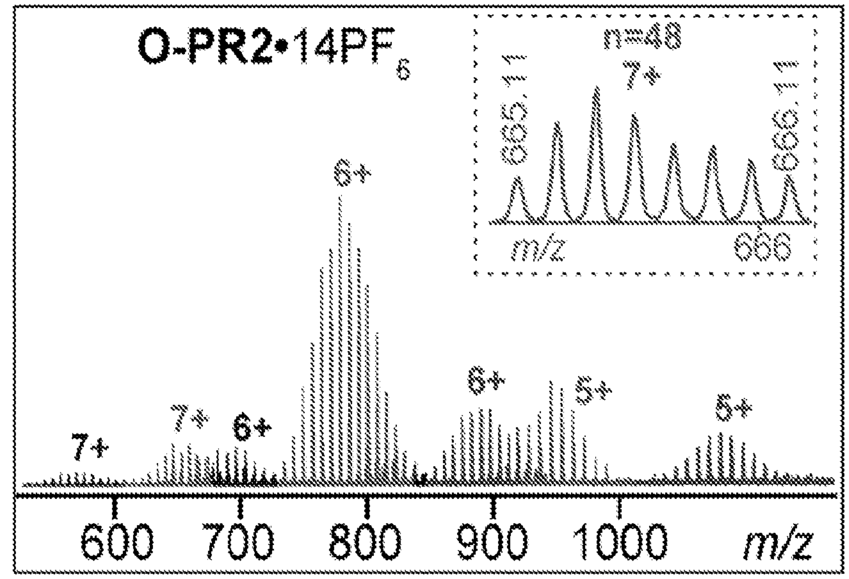

In order to obtain unambiguous evidence of the constitutions of these poly[n]rotaxanes and determine the value of n quantitatively, we have employed electrospray ionization-mass spectrometry (ESI-MS) to the polymer dumbbell precursor—the PEG bis(azide)($M_n$=2000)—to probe the mass-to-charge ratio (m/z) distribution as a function of the different numbers n of repeating $—OCH_2CH_2—$ units in each homogeneous collection of polymer chains. Three sets of signals, which are independently distributed without overlapping with each other, are observed for the charge states ranging from 1+ to 3+, corresponding to $[M+Na]^+$, $[M+2Na]^{2+}$, and $[M+2H+Na]^{3+}$, respectively. This information lays the foundation for an in-depth analysis of $PolyDB^{6+}$ and the derived poly[n]rotaxanes. The ESI-MS analysis of $PolyDB^{6+}$ shows (FIG. 4A) primarily four sets of signals ranging from 3+ to 6+ with each peak matching the chemical composition of $[(C_{66}H_{76}N_{12}O_2)(C_2H_4O)_n(PF_6^-)_x]^{(6-x)+}$. Another set of signals with the charge state 4+ is also observed (FIG. 4A) as a result of the fragmentation of $PolyDB^{6+}$. We reasoned that under the mass spectrometric conditions, the $BIPY^{2+}$ units become labile and fragment from one or both ends, generating polymer dumbbells terminated by benzylic cations and the cleaved monobipyridinium fragments. In order to verify this hypothesis, harsher ESI conditions were applied by increasing both the sampling and extraction cone voltages. A singly charged peak with m/z=436.14 appears as expected with the isotope pattern matching the theoretical simulation of a dissociated monobipyridinium unit. The ESI-MS analysis of O-$PR2^{14+}$ shows (FIG. 4B) the existence of three species. Some of the 5+ and 6+ peaks in FIG. 4B correspond to the intact poly[3]rotaxanes, whereas the other signals are consequences of the fragmentations at one and both ends, respectively. Markedly, the dissociation of the $BIPY^{2+}$ units from the polymer dumbbells does not jeopardize the mechanically interlocked nature of the poly[3]rotaxane because of the steric hindrance provided by the IPP units. Taken overall, these results, together with the $^1H$ NMR spectroscopic analysis (FIG. 3A), clearly indicate that only two rings are pumped onto each individual polymer dumbbell following one redox cycle.

Figure 4D:
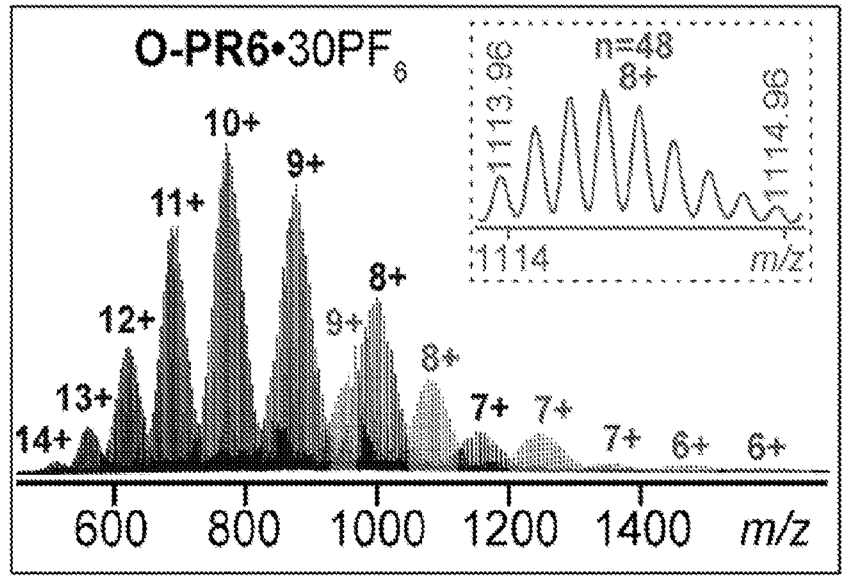

Further analyses on O-PR4$^{22+}$, O-PR6$^{30+}$ and O-PR8$^{38+}$ also reveal (FIGS. 4C, 4D, and 4E) mass spectra with primarily two sets of signals corresponding to the same fragmentations. Despite the fact that the peaks for intact poly[n]rotaxanes are hardly observable, possibly on account of the diminished stability of the BIPY$^{2+}$ units in the case of the larger poly[n]rotaxanes, the mechanically interlocked characteristics of these poly[n]rotaxanes remain intact. Each charge state shows a clear mass distribution assignable to different numbers n of repeating-$OCH_2CH_2$-units. The peaks observed in the spectra can only be assigned to O-PR2$^{22+}$, O-PR6$^{30+}$ and O-PR8$^{38+}$ with the corresponding four, six and eight rings (36) mechanically interlocked with each individual polymer dumbbell, respectively.

Figure 4F:
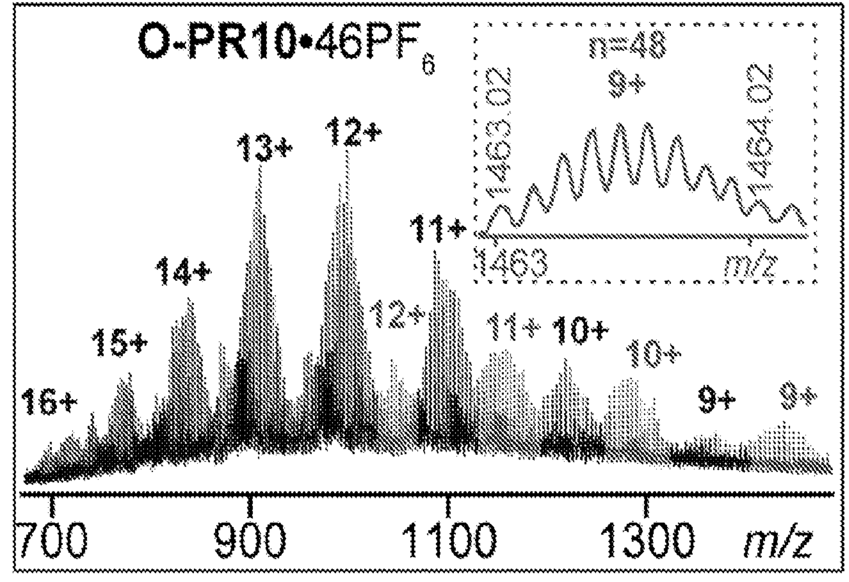

O-PR10$^{46+}$, which has the largest molecular weight amongst the as-synthesized poly[n]rotaxanes, was also analyzed using ESI-MS, revealing (FIG. 4F) a spectrum with only two series of charge states. Despite fragmentation, each peak, after deconvolution, matches the chemical composition of the fragmented O-PR10$^{46+}$ with the number n of repeating —$OCH_2CH_2$— units representing the only difference. It is also evident from careful comparison between the two ESI-MS spectra (FIGS. 4E and 4F) that a trace amount of O-PR8$^{38+}$ is present in the sample of O-PR10$^{46+}$, an observation which implies that a portion of the shorter polymer dumbbells could be already saturated with the CBPQT$^{4+}$ rings, considering the strong repulsions between these positively charged rings. Nevertheless, the findings from ESI-MS lend strong support to the successful precision synthesis of O-PR10$^{46+}$ in one-pot with a well-defined number (10) of rings, affording the out-of-equilibrium polycationic poly[11]rotaxane with high charge densities (46+) on single polymer chains.

Figure 6:
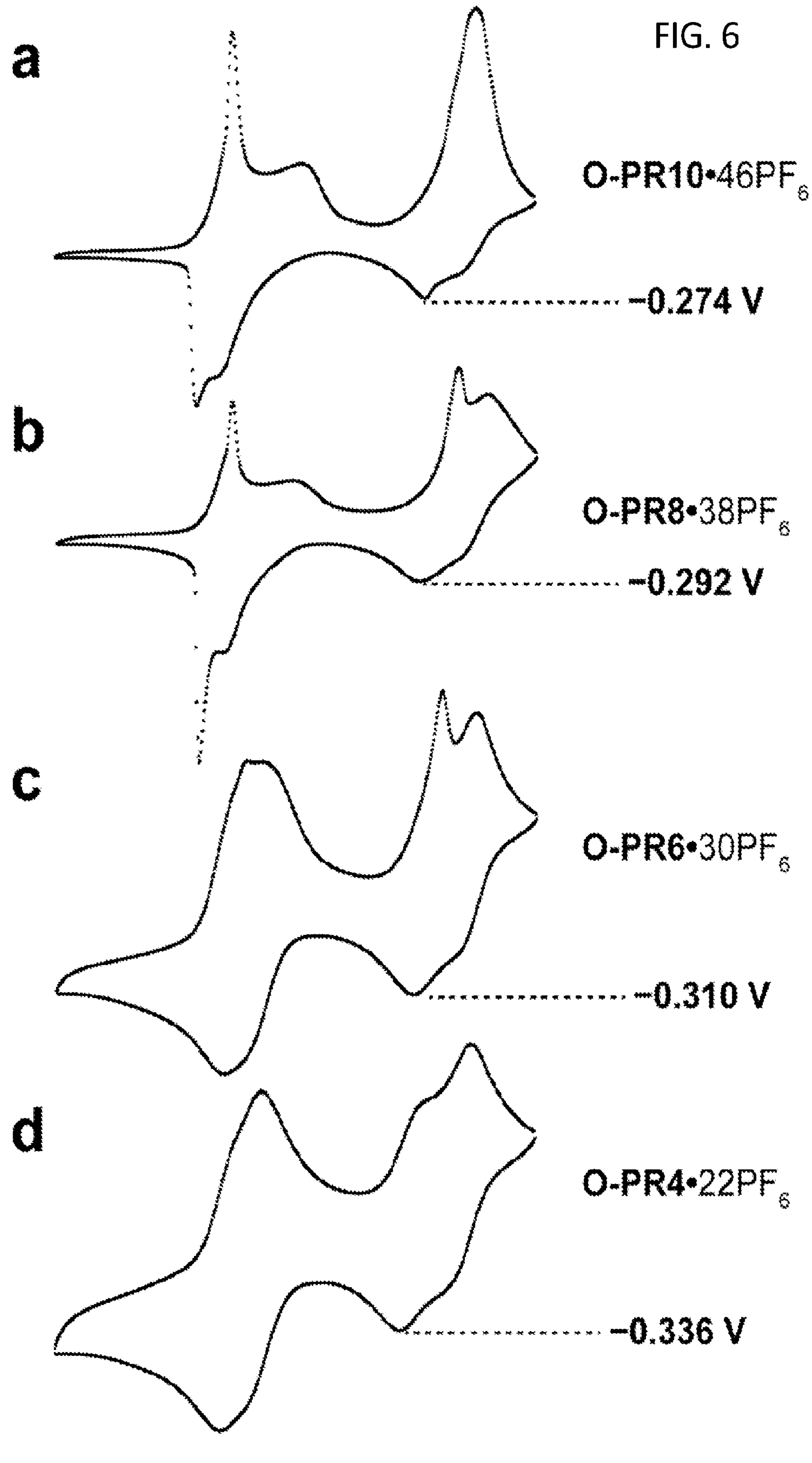
FIG. 6 shows cyclic voltammograms (CVs) of (a)O-PR10-46$PF_6$, (b)O-PR8·38$PF_6$, (c) O-PR6·30$PF_6$, (d)O-PR4·22$PF_6$, (e)O-PR2·14$PF_6$, (f) CBPQT·4$PF_6$, (g) PolyDB·6$PF_6$. The reduction potential shifts positively from-0.352 V to-0.274 V from O-PR2·12$PF_6$ to O-PR10·46$PF_6$, revealing a slight change in the reduction potentials. Note that the reduction potentials, corresponding to the increasing number of $BIPY^{2+}$ units, produce more and more overlapping peaks, such that the CVs become increasingly broad and featureless. CV Experiments of all samples (1 mg/mL) were performed in $N_2$-purged MeCN solutions employing a standard three-electrode apparatus consisting of a glassy carbon working electrode, a Pt wire counter electrode and an Ag/AgCl reference electrode. The concentration of the supporting electrolyte tetrabutylammonium hexafluoro-phosphate ($NBu_4PF_6$) was 0.1 M. Scan rate, 200 mV $s^{-1}$.
Figure 6:
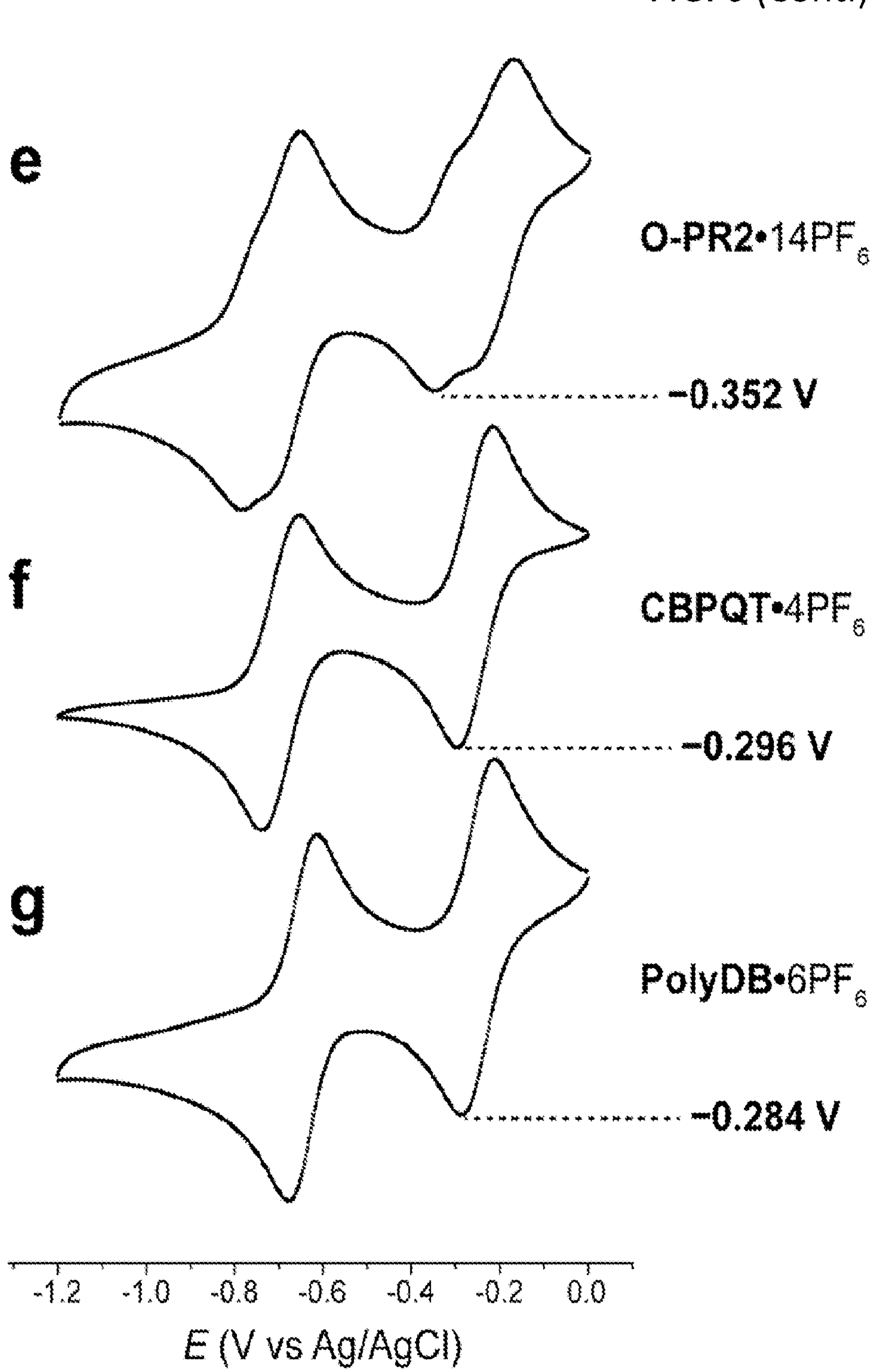

With both stepwise and one-pot chemical redox synthetic strategies established, we turned our attention to developing an additional protocol that could potentially mitigate the accumulation of waste products resulting from the repetitive additions of redox reagents. Cyclic voltammograms (CVs) of all the poly[n]rotaxanes, which revealed nearly identical first reduction potentials (FIG. 6), prove that a similar standard electrochemical protocol employing (35) a reduction potential of −0.7 V during electrolysis, should be applicable to produce higher-order poly[n]rotaxanes. Ultimately, application of the electrochemical synthetic protocol leads to the production of close-to-identical poly[n]rotaxanes E-PR2$^{14+}$, E-PR2$^{22+}$, E-PR6$^{30+}$, and E-PR8$^{38+}$ (E stands for electrochemical) with respect to the chemically-synthesized poly[n]rotaxanes in a stepwise and controlled manner. Although many attempts to synthesize E-PR10$^{46+}$ electrochemically have failed to provide convincing evidence of the exact number of rings using ESI-MS. The $^1$H NMR spectrum of the resulting product reveals a structure similar to that of O-PR10$^{46+}$. All these electrochemically produced poly[n]rotaxanes have been fully characterized by $^1$H NMR spectroscopy and ESI-MS, including confirmation of the targeted number of rings, highlighting the robustness and reliability of AMP-enabled precision synthesis of poly [n]rotaxanes by electrochemical means.

Finally, as the number of rings mechanically interlocked along the polymer dumbbells increase with the number of redox cycles, the random-coil backbones of PEG could become progressively more rigid and manifest an increase in their hydrodynamic diameters (Dh). Accordingly, we have performed additional experiments, including (i) 2D diffusion ordered spectroscopy (DOSY), (ii) size exclusion chromatography (SEC) and (iii) dynamic light scattering (DLS) to probe the differences in size of PolyDB$^{6+}$ and the derived poly[n]rotaxanes. As anticipated, the 2D DOSY experiments reveal (Table 1) a decreased diffusion constant from ($4.11\times10^{-6}$ cm$^2$/s) for PolyDB$^{6+}$ to ($2.30\times10^{-6}$ cm$^2$/s) for O-PR10$^{46+}$, indicating an increase in Dh. The SEC elution profiles show a decrease in elution time with the increasing number of rings. The DLS data confirm (Table 1) the increase in Dh, ranging from ($2.67\pm1.02$ nm) for PolyDB$^{6+}$ to ($4.75\pm1.38$ nm) for O-PR10$^{46+}$. We have also carried out (Table 1) zeta potential measurements which show an increasing value from ($0.77\pm1.16$ mV) for PolyDB$^{6+}$ to ($14.47\pm0.35$ mV) for O-PR10$^{46+}$ as the charges accumulate rapidly with the increasing number of the threaded rings. These observations, taken as a whole, confirm the progressive increase in hydrodynamic diameters ongoing from PolyDB$^{6+}$ to O-PR10$^{46+}$ as a direct result of the accumulation of the threaded rings with a number precisely defined.

The three synthetic protocols, driven either by chemical fuels or by electricity in a sequential, one step at a time, manner and the other, in one fell swoop, in one-pot, illustrate how redox-operated molecular pumps, a subset of artificial molecular machines, represent a milestone in the synthesis of polyrotaxanes. Complete control can be exercised over the precise number (and order) of rings that are recruited and installed onto polymer dumbbells. This deft level of control distinguishes our methodology from all the previously established ones known to us. The implication of this conceptual-cum-practical breakthrough which can, in principle, produce highly programmable polyrotaxanes increasingly away from equilibrium, is far reaching. Given the fact that six positive charges, already associated with the operational components of the dual pump (37), can be augmented by another 8+ to 16+ to 24+ to 32+ to 40+ with the pairwise addition of two, four, six, eight and ten rings, respectively, the possibilities for emergent behavior are rife. This foray into ever increasing non-equilibrium states begs unlimited questions and opens doors to a whole range of new directions that can be pursued in unnatural polymer synthesis. There is the opportunity to tune the materials properties of slide-ring polymers with more or less rings located at will, and almost free of noncovalent bonding interactions with the polymer dumbbells. The fact that palindromic arrays of co-constitutionally heterotopic rings could be positioned on constitutionally symmetrical dumbbells means that it is now possible to use polyrotaxanes, engineered in an appropriate manner, to transcribe their programmed information back into the domain of controlling, by the use of further templation, sequences of building blocks in a new line of wholly synthetic polymers. These possibilities represent little more than the tip of the iceberg.

Unless otherwise specified or indicated by context, the terms “a”, “an”, and “the” mean “one or more.” For example, “a molecule” should be interpreted to mean “one or more molecules.”

As used herein, “about”, “approximately,” “substantially,” and “significantly” will be understood by persons of ordinary skill in the art and will vary to some extent on the context in which they are used. If there are uses of the term which are not clear to persons of ordinary skill in the art given the context in which it is used, “about” and “approximately” will mean plus or minus≤10% of the particular term and “substantially” and “significantly” will mean plus or minus >10% of the particular term.

As used herein, the terms “include” and “including” have the same meaning as the terms “comprise” and “comprising.” The terms “comprise” and “comprising” should be interpreted as being "open" transitional terms that permit the inclusion of additional components further to those components recited in the claims. The terms "consist" and "consisting of" should be interpreted as being "closed" transitional terms that do not permit the inclusion additional components other than the components recited in the claims. The term "consisting essentially of" should be interpreted to be partially closed and allowing the inclusion only of additional components that do not fundamentally alter the nature of the claimed subject matter.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

All references, including publications, patent applications, and patents, cited herein are hereby incorporated by reference to the same extent as if each reference were individually and specifically indicated to be incorporated by reference and were set forth in its entirety herein.

Preferred aspects of this invention are described herein, including the best mode known to the inventors for carrying out the invention. Variations of those preferred aspects may become apparent to those of ordinary skill in the art upon reading the foregoing description. The inventors expect a person having ordinary skill in the art to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Tables

TABLE 1

Molar mass and physical constants of the polymer dumbbell and the derived poly[n]rotaxanes. The theoretical and $^1$H NMR-derived number average molecular weights ($M_n$), diffusion constants (D), hydrodynamic diameters ($D_h$) and zeta potentials (ζ) of PolyDB$^{6+}$, O-PR2$^{14+}$, O-PR4$^{22+}$, O-PR6$^{30+}$, O-PR8$^{38+}$ and O-PR10$^{46+}$. $^1$H NMR and DOSY spectra were measured in $CD_3CN$ on samples where the counterions were $PF^{6-}$, whereas dynamic light scattering (DLS) and zeta potential measurements were conducted in phosphate-buffered saline with either $TFA^-$ or $Cl^-$ as the counterions.

| Sample | PolyDB$^{6+}$ | O-PR2$^{14+}$ | O-PR4$^{22+}$ | O-PR6$^{30+}$ | O-PR8$^{38+}$ | O-PR10$^{46+}$ |
|---|---|---|---|---|---|---|
| $M_n$ (Theory)/ g/mol | 3800 | 6000 | 8200 | 10400 | 12600 | 14800 |
| $M_n$ (NMR)/ g/mol | 4800 | 6200 | 9400 | 11800 | 14000 | 16700 |
| D/cm$^2$/s | $4.11 \times 10^{-6}$ | $3.31 \times 10^{-6}$ | $2.86 \times 10^{-6}$ | $2.66 \times 10^{-6}$ | $2.48 \times 10^{-6}$ | $2.30 \times 10^{-6}$ |
| $D_h$/nm | 2.67 ± 1.02 | 2.74 ± 0.90 | 2.93 ± 1.09 | 4.02 ± 1.12 | 4.48 ± 0.74 | 4.75 ± 1.38 |
| ζ/mV | 0.77 ± 1.16 | 3.14 ± 0.67 | 5.03 ± 0.58 | 6.50 ± 2.34 | 8.48 ± 0.44 | 14.47 ± 0.35 |

REFERENCES AND NOTES

1. J. F. Stoddart, Mechanically interlocked molecules (MIMs)-molecular shuttles, switches, and machines (Nobel Lecture). *Angew. Chem., Int. Ed.* 56, 11094-11125 (2017).

2. C. Pezzato, C. Cheng, J. F. Stoddart, R. D. Astumian, Mastering the non-equilibrium assembly and operation of molecular machines. *Chem. Soc. Rev.* 46, 5491-5507 (2017).

3. S. Erbas-Cakmak, D. A. Leigh, C. T. McTernan, A. L. Nussbaumer, Artificial molecular machines. *Chem. Rev.* 115, 10081-10206 (2015).

4. C. J. Bruns, J. F. Stoddart, The Nature of the Mechanical Bond: From Molecules to Machines (Wiley, 2016).

5. S. Mena-Hernando, E. M. Pérez, Mechanically interlocked materials. Rotaxanes and catenanes beyond the small molecule. *Chem. Soc. Rev.* 48, 5016-5032 (2019).

6. A. Harada, A. Hashidzume, H. Yamaguchi, Y. Takashima, Polymeric rotaxanes. *Chem. Rev.* 109, 5974-6023 (2009).

7. M. Arunachalam, H. W. Gibson, Recent developments in polypseudorotaxanes and polyrotaxanes. *Prog. Polym. Sci.* 39, 1043-1073 (2014).

8. Z. Niu, H. W. Gibson, Polycatenanes. *Chem. Rev.* 109, 6024-6046 (2009).

9. Q. Wu, P. M. Rauscher, X. Lang, R. J. Wojtecki, J. J. de Pablo, M. J. A. Hore, S. J. Rowan, Poly[n] catenanes: Synthesis of molecular interlocked chains. *Science* 358, 1434-1439 (2017).

10. Y. Noda, Y. Hayashi, K. Ito, From topological gels to slide-ring materials. *J. Appl. Polym. Sci.* 131, 40509 (2014).

11. S. Choi, T.-w. Kwon, A. Coskun, J. W. Choi, Highly elastic binders integrating polyrotaxanes for silicon microparticle anodes in lithium ion batteries. *Science* 357, 279-283 (2017).

12. K. K. Cotí, M. E. Belowich, M. Liong, M. W. Ambrogio, Y. A. Lau, H. A. Khatib, J. I. Zink, N. M. Khashab, J. F. Stoddart, Mechanised nanoparticles for drug delivery. *Nanoscale* 1, 16-39 (2009).

13. X. J. Loh, Supramolecular host-guest polymeric materials for biomedical applications. Mater. Horiz. 1, 185-195 (2014).

14. F. M. Raymo, J. F. Stoddart, Interlocked macromolecules. *Chem. Rev.* 99, 1643-1664 (1999).

15. D. J. Cram, The design of molecular hosts, guests, and their complexes. *Science* 240, 760-767 (1988).

16. J.-M. Lehn, Toward self-organization and complex matter. *Science* 295, 2400-2403 (2002).

17. A. Harada, J. Li, M. Kamachi, The molecular necklace: a rotaxane containing many threaded α-cyclodextrins. *Nature* 356, 325-327 (1992).

18. A. B. C. Deutman, C. Monnereau, J. A. A. W. Elemans, G. Ercolani, R. J. M. Nolte, A. E. Rowan, Mechanism of threading a polymer through a macrocyclic ring. *Science* 322, 1668-1671 (2008).

19. F. M. Raymo, J. F. Stoddart, Polyrotaxanes and pseudopolyrotaxanes. *Trends Polym. Sci.* 4, 208-211 (1996).

20. P. R. Ashton, M. Bělohradský, D. Philp, J. F. Stoddart, Slippage—an alternative method for assembling [2]rotaxanes. *J. Chem. Soc., Chem. Commun.*, 1269-1274 (1993).

21. J. Wu, K. C.-F. Leung, J. F. Stoddart, Efficient production of [n]rotaxanes by using template-directed clipping reactions. *Proc. Natl. Acad. Sci. U.S.A* 104, 17266-17271 (2007).

22. M. E. Belowich, C. Valente, R. A. Smaldone, D. C. Friedman, J. Thiel, L. Cronin, J. F. Stoddart, Positive cooperativity in the template-directed synthesis of monodisperse macromolecules. *J. Am. Chem. Soc.* 134, 5243-5261 (2012).

23. N. Momčilović, P. G. Clark, A. J. Boydston, R. H. Grubbs, One-pot synthesis of polyrotaxanes via acyclic diene metathesis polymerization of supramolecular monomers. *J. Am. Chem. Soc.* 133, 19087-19089 (2011).

24. S. Kang, M. M. Cetin, R. Jiang, E. S. Clevenger, M. F. Mayer, Synthesis of metalated pseudorotaxane polymers with full control over the average linear density of threaded macrocycles. *J. Am. Chem. Soc.* 136, 12588-12591 (2014).

25. M. D. Cornelissen, S. Pilon, L. Steemers, M. J. Wanner, S. Frölke, E. Zuidinga, S. I. Jørgensen, J. I. van der Vlugt, J. H. van Maarseveen, A Covalent and modular synthesis of homo- and hetero [n]rotaxanes. *J. Org. Chem.* 85, 3146-3159 (2020).

26. J. E. M. Lewis, J. Winn, L. Cera, S. M. Goldup, Iterative synthesis of oligo [n]rotaxanes in excellent yield. *J. Am. Chem. Soc.* 138, 16329-16336 (2016).

27. K. Mayumi, K. Ito, K. Kato, Polyrotaxane and Slide-Ring Materials (RSC, 2016).

28. C. Cheng, P. R. McGonigal, S. T. Schneebeli, H. Li, N. A. Vermeulen, C. Ke, J. F. Stoddart, An artificial molecular pump. *Nat. Nanotechnol.* 10, 547-553 (2015).

29. C. Pezzato, M. T. Nguyen, C. Cheng, D. J. Kim, M. T. Otley, J. F. Stoddart, An efficient artificial molecular pump. *Tetrahedron* 73, 4849-4857 (2017).

30. Y. Qiu, L. Zhang, C. Pezzato, Y. Feng, W. Li, M. T. Nguyen, C. Cheng, D. Shen, Q.-H. Guo, Y. Shi, K. Cai, F. M. Alsubaie, R. D. Astumian, J. F. Stoddart, A molecular dual pump. *J. Am. Chem. Soc.* 141, 17472-17476 (2019).

31. R. D. Astumian, I. Derényi, Fluctuation driven transport and models of molecular motors and pumps. *Eur. Biophys. J.* 27, 474-489 (1998).

32. Considering the molecular weight ($M_n$=2000) of the chosen PEG, we can estimate no more than 17 rings can be pumped onto the polymer collecting chains based on the estimate that each ring can roughly occupy eight-carbon length of space on the collecting chain.

33. H. C. Kolb, M. G. Finn, K. B. Sharpless, Click chemistry: Diverse chemical function from a few good reactions. *Angew. Chem., Int. Ed.* 40, 2004-2021 (2001).

34. Y. Wang, M. Frasconi, J. F. Stoddart, Introducing stable radicals into molecular machines. *ACS Cent. Sci.* 3, 927-935 (2017).

35. A reduction time of 10 min with Zn powder is more than sufficient to power the molecular pump. Thus, the proceeding time for the reduction here is set to be 30 min in order to achieve exhaustive complexations of a pair of rings onto the pumps, as cobaltocene is a stronger reducing reagent than Zn.

36. It is noticeable that a trace amount of polyrotaxanes with an odd number of rings are present in the ESI-MS spectra of S-PR$6^{30+}$, O-PR$2^{22+}$, O-PR$8^{38+}$ and E-PR$6^{30+}$ (data not shown).

37. C. Pezzato, M. T. Nguyen, D. J. Kim, O. Anamimoghadam, L. Mosca, J. F. Stoddart, Controlling dual molecular pumps electrochemically. *Angew. Chem., Int. Ed.* 57, 9325-9329 (2018).

38. Although many attempts to synthesize E-PR$10^{46+}$ electrochemically have failed to provide convincing evidence of the exact number of rings using ESI-MS. The $^1$H NMR spectrum of the resulting product reveals a structure similar to that of O-PR$10^{46+}$, which is obviously different from that of its starting material E-PR$8^{38+}$.

39. J. C. Barnes, M. Juríček, N. A. Vermeulen, E. J. Dale, J. F. Stoddart, Synthesis of Ex" Box cyclophanes. *J. Org. Chem.* 78, 11962-11969 (2013).

40. P. Thordarson, Determining association constants from titration experiments in supramolecular chemistry. *Chem. Soc. Rev.* 40, 1305-1323 (2011).

EXAMPLES

Materials and Methods

All compounds were purchased from commercial sources and used as received. Polyoxyethylene bis(azide)(average $M_n$ 2000) was purchased from Sigma-Aldrich and used as received. All reactions and manipulations involving air- and water-sensitive compounds were carried out under a dry $N_2$ atmosphere using a glovebox or standard Schlenk techniques. MP·3$PF_6$ and CBPQT·4$PF_6$ were prepared (27, 35) according to published procedures. Reaction yields are based on the assumption that the number average molecular weight of the polymer is 2000 g/mol. All reaction solvents including acetone ($Me_2CO$) and acetonitrile (MeCN) were degassed with Ar and dried prior to use. All solvents and chemicals, employed in extractions and column chromatography, were used as received.

Thin layer chromatography (TLC) was performed on silica gel 60 F254 (E. Merck). Column chromatography, including both normal phase (RediSep Rf Gold® Normal-Phase Silica) and reversed-phase (RediSep Rf Gold® Reversed-Phase C18), were carried out using CombiFlash® Automation Systems (Teledyne ISCO).

Nuclear magnetic resonance (NMR) spectra were recorded on a Bruker Neo 600 MHz spectrometer with QCI-F cryoprobe ($^1$H sensitivity=5000), with working frequencies of 600 ($^1$H NMR) and 150 ($^{13}$C NMR) MHz. Chemical shifts are reported in ppm relative to the signals corresponding to the residual non-deuterated solvents ($CD_3CN$: $\delta_H$=1.94 ppm and $\delta_C$=118.3 ppm; $CDCl_3$: $\delta_H$=7.26 ppm and $\delta_C$=77.2 ppm; $C_2D_6CO$: $\delta_H$=2.05 ppm and $\delta_C$=206.3 ppm). An internal standard (mesitylene, analytical standard) was added into $CD_3CN$ (2 mM) prior to quantitative NMR spectroscopic analysis. Tl Relaxation times of each major proton resonance of interest were measured using the inversion-recovery technique (acquisition time: 5 s, relaxation delay time: 70 s, number of scan (ns): 8 and variable delay list (VDLIST): 0.1, 0.4, 0.8, 1.6, 3.2, 7, 12, 18, 25, 30). The proton signal with the longest Tl relaxation time was found to be the aromatic proton resonance of mesitylene (7.65 s). As a result, D1 relaxation delay times, when recording $^1$H NMR spectra, were set at 40 s in order to obtain accurate signal integrations. Quantitative $^1$H NMR spectra were measured by dissolving polymer samples ($PF_6^-$ anions) in $CD_3CN$ (mesitylene, 2 mM) to produce a 2 mg/mL solution. The NMR spectrometer was set with the following parameters: the relaxation delay time (D1): 40 s; the number of scans (ns): 128. The number average molecular weight of PolyDB·6$PF_6$ and each polyrotaxanes samples were calculated based on integration values (I) from the aromatic proton resonance of the internal standard (I[IS], mesitylene, 2 mM) and the sum of proton resonances ($H_\alpha$, $H_6$ and $H_9$) in either PolyDB·6$PF_6$ or the polyrotaxanes samples (2 mg/mL).

2D DOSY NMR Spectroscopy was conducted using 0.4 mg/mL polymer samples, dissolved in $CD_3CN$ (mesitylene, 2 mM). The spectrometer was set with the following parameters: the pulse sequence: Bruker pulse program dstebpgp3s; the relaxation delay (D1): 8 s; the diffusion time (D20): 0.06 s; the diffusion gradient pulse length (P30): 1.5 ms; the number of scan (ns): 48; the number of gradient steps: 32 steps with linear spacing; the gradient range: 2-95%. A larger, or near 95%, signal decay for the final gradient strength was achieved by applying these parameters across all sample measurements with a nearly identical diffusion constant ($2.91\times10^{-5}$ $cm^2/s$) for the internal standard.

Cyclic voltammetry (CV) was carried out at room temperature in $N_2$-purged MeCN solutions with a Gamry Multipurpose instrument (Reference 600) interfaced to a PC. CVs on all samples (1 mg/mL) were performed using a glassy carbon working electrode (0.071 $cm^2$). The electrode surface was polished routinely with 0.05 μm alumina-water slurry on a felt surface immediately before use. The counter electrode was a Pt wire and the reference electrode was a Ag/AgCl electrode. The concentration of the supporting electrolyte, tetrabutylammonium hexafluorophosphate ($NBu_4PF_6$), was 0.1 M. The scan rate is 200 mV $s^{-1}$.

All the controlled potential electrolysis (CPE) experiments (33) were performed inside a plastic glovebox filled with $N_2$. The home-built electrolysis apparatus is based on a BASi® bulk electrolysis cell which contains (i) a reticular vitreous carbon working electrode, (ii) a coiled platinum wire auxiliary electrode separated in a fritted glass chamber, and (iii) a Ag/AgCl reference electrode. The whole apparatus, including all three electrodes, were connected to a Gamry multipurpose instrument (Reference 600) interfaced to a PC. The experimental parameters were instructed using a Gamry Framework Version 6.30 under the chronocoulometry experiment.

All experiments were carried out in anhydrous MeCN solutions containing $TBAPF_6$ (0.1 M) as the supporting electrolyte: the working cell consists of a solution of PolyDB·6TFA or a polyrotaxane (to produce a polyrotaxanes with more rings) and CBPQT·4$PF_6$ under vigorous stirring (800 rpm) at 40° C., while the auxiliary electrode chamber is filled with ferrocene as the sacrificial reductant (oxidant) to balance the anodic (cathodic) current during redox cycles. Electrodes were cleaned as follow: the vitreous carbon electrode was sonicated three times using MeCN with active carbon, further sonicated three times using DI water and dried under a stream of $N_2$ overnight; the coiled platinum wire was soaked into $H_2SO_4$ and $HNO_3$, then rinsed profusely with $H_2O$, and finally burned red hot with a propane torch flame and stored under a $N_2$ atmosphere. The reference electrode was rinsed with abundant dry MeCN or $H_2O$ before or after use, respectively.

ESI-MS Spectra of the polyrotaxanes were obtained on Waters Synapt G2 mass spectrometer. The samples were prepared as a 0.3 mg/mL solution in MeCN and injected directly into the ESI probe with a flow rate of 3 mL/h. The instrument was set according to the following conditions: ESI capillary voltage, 2.0-2.5 kV; sample cone voltage, 15-20 V; extraction cone voltage, 0-0.1 V; source temperature, 100° C.; desolvation temperature, 160° C.; cone gas flow, 10 L/h; desolvation gas flow, 700 L/h ($N_2$); source gas control, 0 mL/min; trap gas control, 2.5 mL/min.

Dynamic Light Scattering (DLS) measurements were conducted using a Punk DLS from Unchained Labs (cuvette, 12.5 mm square-walled disposable cuvettes; temperature, 20° C.; dispersant, phosphate-buffered saline solution; light source, 660 nm laser diode; scattering angle,) 90°. The reported hydrodynamic diameters were averaged results from 10 runs with each duration of 30 s. All samples ($Cl^-$ or $TFA^-$ anions) were measured in PBS buffer at a concentration of 3 mg/mL.

Size-Exclusion Chromatography (SEC) results for all samples (3 mg/mL in PBS buffer) were obtained using a PSS NOVEMA Max analytical column (molar mass range: 100-100000) with phosphate-buffered saline as eluent at 30° C. Detection units include (i) a Wyatt Optilab T-rEX refractive index detector, (ii) a Wyatt DAWN® HELEOS® II light scattering detector and (iii) an in-line Agilent UV detector.

Zeta potential measurements were conducted using a Zetasizer Nano-ZS (Malvern) instrument. The reported data were averaged based on three measurements with each measurement containing 30 runs.

Synthetic Protocols

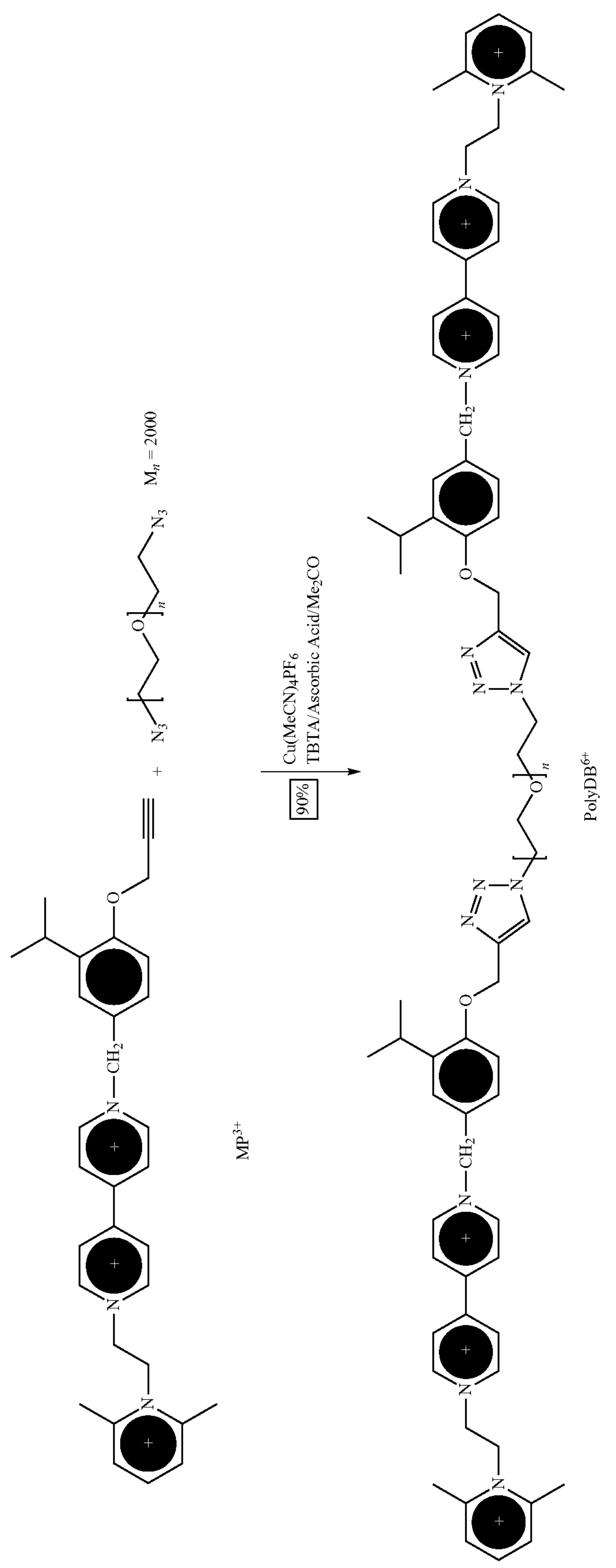
$MP^{3+}$
$PolyDB^{6+}$

Scheme 1. Synthesis of PolyDB·6TFA

PolyDB·6TFA: A 20-mL scintillation vial in a $N_2$-filled glovebox was charged with MP·3$PF_6$ (470 mg, 0.51 mmol), polyoxyethylene bis(azide)(470 mg, 0.24 mmol), Cu (MeCN) 4$PF_6$ (38 mg, 0.10 mmol), and tris [(1-benzyl-$^1$H-1,2,3-triazol-4-yl)methyl]amine (TBTA)(54 mg, 0.10 mmol) in $Me_2CO$ (10 mL). The reaction mixture was stirred at 40° C. for 48 h before an excess of ascorbic acid was added. The mixture was stirred for another 48 h. The crude product was purified using reversed-phase column chromatography (0.1% v/v TFA in $H_2O$ and 0.1% v/v TFA in MeCN) twice to remove the excess of $MP^{3+}$. The fractions containing the product were concentrated by rotary evaporation. The final product PolyDB·6TFA (766 mg, 90%) was obtained as a viscous yellow oil. A portion of this product was exchanged to the $PF_6^-$ salt with satd $KPF_6$ aqueous solution for $^1$H NMR spectroscopic and mass spectrometric analyses. $^1$H NMR (600 MHz, $CD_3CN$): 8 9.04-8.93 (m, $\delta_H$), 8.49 (d, J=6.9 Hz, 4H), 8.44-8.37 (m, 4H), 8.33 (t, J=7.9 Hz, 2H), 7.95 (s, 2H), 7.83 (d, J=7.9 Hz, 4H), 7.43 (d, J=2.4 Hz, 2H), 7.36 (dd, J=8.4, 2.4 Hz, 2H), 7.23 (d, J=8.5 Hz, 2H), 5.76 (s, 4H), 5.22 (s, 4H), 5.09-4.97 (m, $\delta_H$), 4.56-4.48 (m, 4H), 3.89-3.81 (m, 4H), 3.62-3.46 (m, 172H), 2.85 (s, 12H), 1.19 (d, J=6.9 Hz, 12H).

Stepwise(S) Chemical Synthesis of Polyrotaxanes

S-PR2·14$PF_6$: A 20-mL scintillation vial inside a $N_2$-filled glovebox was charged with PolyDB·6TFA (21.3 mg, 5.86 μmol) and CBPQT·4$PF_6$ (52 mg, 0.047 mmol) in MeCN (5 mL). The amount of MeCN needed in this reaction was estimated to ensure that the final concentration of the free CBPQT·4$PF_6$ was no more than 10 mg/mL after adding the reducing solution. A stock bis(cyclopentadienyl) cobalt (II) solution (17.8 mg/mL, 1.13 mL, 0.11 mmol) was added to the vial and the resulting deep blue/purple solution was stirred at room temperature for 30 min. Solid $NOPF_6$ was added portionwise until the solution color changed to yellow. This yellow solution was then stirred at 40° C. for 10 min. The crude product was purified using reversed-phase column chromatography (0.1% v/v TFA in water and 0.1% v/v TFA in MeCN), followed by counterion exchange with satd $KPF_6$ aqueous solution to afford the final product S-PR2·14$PF_6$ as a yellow solid (18 mg, 51%). $^1$H NMR (600 MHz, $C_2D_6CO$): δ 9.65-9.58 (m, 4H), 9.55-9.45 (m, 20H), 8.91-8.86 (m, 4H), 8.83-8.77 (m, 20H), 8.51 (t, J=7.9 Hz, 2H), 8.13 (s, 2H), 8.07 (d, J=7.9 Hz, 4H), 7.86 (s, 16H), 7.63 (d, J=2.3 Hz, 2H), 7.53 (dd, J=8.5, 2.3 Hz, 2H), 7.30 (d, J=8.5 Hz, 2H), 6.17-6.02 (m, 20H), 5.76-5.58 (m, $\delta_H$), 5.26 (s, 4H), 4.58 (t, J=5.2 Hz, 4H), 3.89 (t, J=5.1 Hz, 4H), 3.64-3.19 (m, 193H), 3.15 (s, 12H), 1.17 (d, J=6.9 Hz, 12H).

S-PR4·22$PF_6$: A 20-mL scintillation vial inside a $N_2$-filled glovebox was charged with S-PR2·14$PF_6$ (14 mg, 2.32 μmol) and CBPQT·4$PF_6$ (20 mg, 0.018 mmol) in MeCN (1.5 mL). The amount of MeCN needed in this reaction was estimated to ensure that the final concentration of the free CBPQT·4$PF_6$ was no more than 10 mg/mL after adding the reducing solution. A stock bis(cyclopentadienyl) cobalt (II) solution (17.8 mg/mL, 0.54 mL, 0.05 mmol) was added to the vial and the resulting deep blue/purple solution was stirred at room temperature for 30 min. Solid $NOPF_6$ was added portionwise until the solution color changed to yellow. This yellow solution was then stirred at 40° C. for 10 min. The crude product was purified using reversed-phase column chromatography (0.1% v/v TFA in water and 0.1% v/v TFA in MeCN), followed by counterion exchange with satd $KPF_6$ aqueous solution to afford the final product S-PR4·22$PF_6$ as a yellow solid (11 mg, 58%). $^1$H NMR (600 MHz, $C_2D_6CO$): δ 9.64-9.59 (m, 4H), 9.51-9.44 (m, 36H), 8.90-8.86 (m, 4H), 8.81-8.76 (m, 36H), 8.51 (t, J=7.9 Hz, 2H), 8.11 (s, 2H), 8.07 (d, J=7.9 Hz, 4H), 7.87-7.83 (m, 32H), 7.63 (d, J=2.3 Hz, 2H), 7.53 (dd, J=8.4, 2.4 Hz, 2H), 7.29 (d, J=8.5 Hz, 2H), 6.14-6.03 (m, 36H), 5.75-5.63 (m, $\delta_H$), 5.24 (s, 4H), 4.56 (s, 4H), 3.87 (s, 4H), 3.54-2.85 (m, 202H), 1.16 (d, J=6.9 Hz, 12H).

S-PR6·30$PF_6$: A 20-mL scintillation vial inside a $N_2$-filled glovebox was charged with S-PR4·22$PF_6$ (24 mg, 2.92 μmol) and CBPQT·4$PF_6$ (26 mg, 0.024 mmol) in MeCN (3 mL). The amount of MeCN needed in this reaction was estimated to ensure that the final concentration of the free CBPQT·4$PF_6$ was no more than 10 mg/mL after adding the reducing solution. A stock bis(cyclopentadienyl) cobalt (II) solution (17.8 mg/mL, 0.8 mL, 0.075 mmol) was added to the vial and the resulting deep blue/purple solution was stirred at room temperature for 30 min. Solid $NOPF_6$ was added portionwise until the solution color changed to yellow. This yellow solution was then stirred at 40° C. for 10 min. The crude product was purified using reversed-phase column chromatography (0.1% v/v TFA in water and 0.1% v/v TFA in MeCN), followed by counterion exchange with satd $KPF_6$ aqueous solution to afford the final product S-PR6·30$PF_6$ as a yellow solid (11 mg, 37%). $^1$H NMR (600 MHz, $C_2D_6CO$): δ 9.65-9.60 (m, 4H), 9.51-9.43 (m, 52H), 8.91-8.85 (m, 4H), 8.83-8.71 (m, 52H), 7.87-7.82 (m, 48H), 6.15-6.01 (m, 52H).

One-Pot (O) Chemical Synthesis of Polyrotaxanes

O-PR2·14$PF_6$: A 20-mL scintillation vial inside a $N_2$-filled glovebox was charged with PolyDB·6TFA (53 mg, 14.58 μmol) and CBPQT·4$PF_6$ (128 mg, 0.116 mmol) in MeCN (9 mL). The amount of MeCN needed in this reaction was estimated to ensure that the final concentration of the free CBPQT·4$PF_6$ was no more than 10 mg/mL after adding the reducing solution. A stock bis(cyclopentadienyl) cobalt (II) solution (13 mg/mL, 4.01 mL, 0.276 mmol) was added to the vial and the resulting deep blue/purple solution was stirred at room temperature for 30 min. Solid $NOPF_6$ was added portionwise until the solution color changed to yellow. This yellow solution was then stirred at 40° C. for 10 min. The crude product was purified using reversed-phase column chromatography (0.1% v/v TFA in water and 0.1% v/v TFA in MeCN), followed by counterion exchange with satd $KPF_6$ aqueous solution to afford the final product O-PR2·14$PF_6$ as a yellow solid (55 mg, 63%). $^1$H NMR (600 MHz, $CD_3CN$): δ 9.08-8.90 (m, 24H), 8.51-8.37 (m, 24H), 8.33 (t, J=7.9 Hz, 2H), 7.93 (s, 2H), 7.83 (d, J=7.9 Hz, 4H), 7.57 (s, 16H), 7.43 (d, J=2.4 Hz, 2H), 7.37 (dd, J=8.5, 2.4 Hz, 2H), 7.23 (d, J=8.4 Hz, 2H), 5.82-5.68 (m, 20H), 5.21 (s, 4H), 5.11-4.95 (m, $\delta_H$), 4.50 (t, J=5.2 Hz, 4H), 3.84 (t, J=4·9 Hz, 4H), 3.58-2.98 (m, 167H), 2.85 (s, 12H), 1.19 (d, J=6.9 Hz, 12H).

O-PR4·22$PF_6$: A 40-mL scintillation vial inside a $N_2$-filled glovebox was charged with PolyDB·6TFA (53 mg, 14.58 μmol) and CBPQT·4$PF_6$ (128 mg, 0.116 mmol) in MeCN (9 mL). The amount of MeCN needed in this reaction was estimated to ensure that the final concentration of the free CBPQT·4$PF_6$ was no more than 10 mg/mL after adding the reducing solution. A stock bis(cyclopentadienyl) cobalt (II) solution (13 mg/mL, 4.01 mL, 0.276 mmol) was added for the first time to the vial and the resulting deep blue/purple solution was stirred at room temperature for 30 min. Solid $NOPF_6$ was added portionwise until the solution color changed to yellow. This yellow solution was stirred at 40° C. for 10 min and then brought back to room temperature. CBPQT·4$PF_6$ (32 mg, 0.029 mmol) in MeCN (1 mL) was added to this solution and the stock $CoCp_2$ solution was carefully added dropwise to react with the excess of $NOPF_6$ which was followed by a color change from yellow to light green. At the same time, a calculated amount of $CoCp_2$ stock solution (13 mg/mL, 4.90 mL, 0.337 mmol) was added for a second time to the vial and the resulting deep blue/purple solution was stirred at room temperature for 30 min. Solid $NOPF_6$ was added portionwise for a second time until the solution color changed to yellow. This yellow solution was stirred at 40° C. for 10 min. The crude product was purified using reversed-phase column chromatography (0.1% v/v TFA in water and 0.1% v/v TFA in MeCN), followed by counterion exchange with satd $KPF_6$ aqueous solution to afford the final product O-PR4·$22PF_6$ as a yellow solid (39 mg, 33%). $^1H$ NMR (600 MHz, $CD_3CN$): δ 9.06-8.91 (m, 40H), 8.52-8.35 (m, 40H), 7.64-7.54 (m, 32H), 5.84-5.67 (m, 37H).

O-PR6·$30PF_6$: A 40-mL scintillation vial inside a $N_2$-filled glovebox was charged with PolyDB·6TFA (53 mg, 14.58 μmol) and CBPQT·$4PF_6$ (128 mg, 0.116 mmol) in MeCN (9 mL). The amount of MeCN needed in this reaction was estimated to ensure that the final concentration of the free CBPQT·$4PF_6$ was no more than 10 mg/mL after adding the reducing solution. A stock bis(cyclopentadienyl) cobalt (II) solution (13 mg/mL, 4.01 mL, 0.276 mmol) was added for the first time to the vial and the resulting deep blue/purple solution was stirred at room temperature for 30 min. Solid $NOPF_6$ was added portionwise until the solution color changed to yellow. This yellow solution was stirred at 40° C. for 10 min and then brought back to room temperature.

CBPQT·$4PF_6$ (32 mg, 0.029 mmol) in MeCN (1 mL) was added to this solution and the stock $CoCp_2$ solution was carefully added dropwise to react with the excess of $NOPF_6$ which was followed by a color change from yellow to light green. After the event, a calculated amount of the stock $CoCp_2$ solution (13 mg/mL, 4.90 mL, 0.337 mmol) was added for a second time to the vial and the resulting deep blue/purple solution was stirred at room temperature for 30 min. Solid $NOPF_6$ was added portionwise for a second time until the solution color changed to yellow. This yellow solution was stirred at 40° C. for 10 min and then brought back to room temperature.

The description in the preceding paragraph was repeated for a third time by adding CBPQT·$4PF_6$ (32 mg, 0.029 mmol), the stock $CoCp_2$ reducing solution (13 mg/mL, 5.78 mL, 0.398 mmol) and the $NOPF_6$ oxidant. The crude product was purified using reversed-phase column chromatography (0.1% v/v TFA in water and 0.1% v/v TFA in MeCN), followed by counterion exchange with satd $KPF_6$ aqueous solution to afford the final product O-PR6·$30PF_6$ as a yellow solid (85 mg, 56%). $^1H$ NMR (600 MHz, $CD_3CN$): δ 9.08-8.90 (m, 56H), 8.53-8.24 (m, 57H), 7.64-7.54 (m, 49H), 5.82-5.68 (m, 52H).

O-PR8·$38PF_6$: A 40-mL scintillation vial inside a $N_2$-filled glovebox was charged with PolyDB·6TFA (53 mg, 14.58 μmol) and CBPQT·$4PF_6$ (128 mg, 0.116 mmol) in MeCN (9 mL). The amount of MeCN needed in this reaction was estimated to ensure that the final concentration of the free CBPQT·$4PF_6$ was no more than 10 mg/mL after adding the reducing solution. A stock bis(cyclopentadienyl) cobalt (II) solution (13 mg/mL, 4.01 mL, 0.276 mmol) was added for the first time to the vial and the resulting deep blue/purple solution was stirred at room temperature for 30 min. Solid $NOPF_6$ was added portionwise until the solution color changed to yellow. This yellow solution was stirred at 40° C. for 10 min and then brought back to room temperature.

CBPQT·$4PF_6$ (32 mg, 0.029 mmol) in MeCN (1 mL) was added to this solution and the stock $CoCp_2$ solution was carefully added dropwise to react with the excess of $NOPF_6$ which was followed by a color change from yellow to light green. After the event, a calculated amount of the stock $CoCp_2$ solution (13 mg/mL, 4.90 mL, 0.337 mmol) was added for a second time to the vial and the resulting deep blue/purple solution was stirred at room temperature for 30 min. Solid $NOPF_6$ was added portionwise for a second time until the solution color changed to yellow. This yellow solution was stirred at 40° C. for 10 min and then brought back to room temperature.

The description in the preceding paragraph was repeated for a third time by adding CBPQT·$4PF_6$ (32 mg, 0.029 mmol), the stock $CoCp_2$ reducing solution (13 mg/mL, 5.78 mL, 0.398 mmol) and the $NOPF_6$ oxidant, and for a fourth time by adding CBPQT·$4PF_6$ (32 mg, 0.029 mmol), the stock $CoCp_2$ reducing solution (13 mg/mL, 6.68 mL, 0.459 mmol) and the $NOPF_6$ oxidant. The crude product was purified using reversed-phase column chromatography (0.1% v/v TFA in water and 0.1% v/v TFA in MeCN), followed by counterion exchange with satd $KPF_6$ aqueous solution to afford the final product O-PR8·$38PF_6$ as a yellow solid (100 mg, 54%). $^1H$ NMR (600 MHz, $CD_3CN$): δ 9.15-8.76 (m, 72H), 8.56-7.93 (m, 76H), 7.79-7.54 (m, 64H), 5.95-5.56 (m, 71H).

O-PR10·$46PF_6$: A 40-mL scintillation vial inside a $N_2$-filled glovebox was charged with PolyDB·6TFA (27 mg, 7.43 μmol) and CBPQT·$4PF_6$ (64 mg, 0.058 mmol) in MeCN (4 mL). The amount of MeCN needed in this reaction is estimated to ensure that the final concentration of the free CBPQT·$4PF_6$ is no more than 10 mg/mL after adding the reducing solution. A stock bis(cyclopentadienyl) cobalt (II) solution (13 mg/mL, 2.00 mL, 0.138 mmol) was added for the first time to the vial and the resulting deep blue/purple solution was stirred at room temperature for 30 min. Solid $NOPF_6$ was added portionwise until the solution color changed to yellow. This yellow solution was stirred at 40° C. for 10 min and then brought back to room temperature.

CBPQT·$4PF_6$ (16 mg, 0.015 mmol) in MeCN (1 mL) was added to this solution and the stock $CoCp_2$ solution was carefully added dropwise to react with the excess of $NOPF_6$ which was followed by a color change from yellow to light green. After the event, a calculated amount of the stock $CoCp_2$ solution (13 mg/mL, 2.48 mL, 0.171 mmol) was added for a second time to the vial and the resulting deep blue/purple solution was stirred at room temperature for 30 min. Solid $NOPF_6$ was added portionwise for a second time until the solution color changed to yellow. This yellow solution was stirred at 40° C. for 10 min and then brought back to room temperature.

The description in the preceding paragraph was repeated for a third time by adding CBPQT-$4PF_6$ (16 mg, 0.015 mmol), the stock $CoCp_2$ reducing solution (13 mg/mL, 2.90 mL, 0.199 mmol) and the $NOPF_6$ oxidant, for a fourth time by adding CBPQT·$4PF_6$ (16 mg, 0.015 mmol), the stock $CoCp_2$ reducing solution (13 mg/mL, 3.35 mL, 0.230 mmol) and the $NOPF_6$ oxidant and for a fifth time by adding CBPQT·$4PF_6$ (16 mg, 0.015 mmol), the stock $CoCp_2$ reducing solution (13 mg/mL, 3.80 mL, 0.261 mmol) and the $NOPF_6$ oxidant. The crude product was purified using reversed-phase column chromatography (0.1% v/v TFA in water and 0.1% v/v TFA in MeCN), followed by counterion exchange with satd $KPF_6$ aqueous solution to afford the final product O-PR10·$46PF_6$ as a yellow solid (40 mg, 36%). $^1H$ NMR (600 MHz, $CD_3CN$): δ 9.19-8.79 (m, 88H), 8.59-7.86 (m, 94H), 7.80-7.54 (m, 80H), 5.94-5.61 (m, 87H).

Electrochemical Synthesis of Polyrotaxanes by Controlled Potential Electrolysis

E-PR2·14$PF_6$: PolyDB·6TFA (21 mg, 5.78 μmol) and CBPQT·4$PF_6$ (66 mg, 0.06 mmol) were dissolved in MeCN (30 mL, 0.1 M $TBAPF_6$) in the working cell, while the auxiliary electrode chamber was filled with ferrocene dissolved in MeCN (1 mL, 0.1 M $TBAPF_6$). The apparatus was subjected to one redox cycle at 40° C. with alternate constant potentials of-0.7 V (reduction potential vs Ag/AgCl) and +1.4 V (oxidation potential vs Ag/AgCl) for 20 min with resting periods of 20 and 10 min, respectively. After the redox cycle was complete, the solution in the working cell was transferred to a 250-mL round-bottomed flask and MeCN was removed on rotary evaporator. The crude product was washed with $CHCl_3$ (3×40 mL) by centrifuge to remove the excess of $TBAPF_6$ and collected as a yellow/brown solid. The crude product was then purified using reversed-phase column chromatography (0.1% v/v TFA in water and 0.1% v/v TFA in MeCN), followed by counterion exchange with satd $KPF_6$ aqueous solution to afford the final product E-PR2·14$PF_6$ as a yellow solid (22 mg, 63%). $^1$H NMR (600 MHz, $C_2D_6CO$): δ 9.65-9.59 (m, 4H), 9.53-9.45 (m, 20H), 8.91-8.86 (m, 4H), 8.83-8.76 (m, 20H), 8.51 (t, J=7.9 Hz, 2H), 8.13 (s, 2H), 8.06 (d, J=7.9 Hz, 4H), 7.87-7.84 (m, 16H), 7.63 (d, J=2.4 Hz, 2H), 7.53 (dd, J=8.5, 2.3 Hz, 2H), 7.34-7.26 (m, 2H), 6.15-6.03 (m, 20H), 5.74-5.62 (m, $\delta_H$), 5.28-5.24 (m, 4H), 4.62-4.56 (m, 4H), 3.94-3.84 (m, 4H), 3.69-3.19 (m, 207H), 3.15 (s, 12H), 1.20-1.15 (m, 12H).

E-PR4·22$PF_6$: PR2·14$PF_6$ (20 mg, 3.32 μmol) and CBPQT·4$PF_6$ (36 mg, 0.033 mmol) were dissolved in MeCN (30 mL, 0.1 M $TBAPF_6$) in the working cell, while the auxiliary electrode chamber was filled with ferrocene dissolved in MeCN (1 mL, 0.1 M $TBAPF_6$). The apparatus was subjected to one redox cycle at 40° C. with alternate constant potentials of-0.7 V (reduction potential vs Ag/AgCl) and +1.4 V (oxidation potential vs Ag/AgCl) for 12 min with resting periods of 20 and 10 min, respectively. After the redox cycle was complete, the solution in the working cell was transferred to a 250-mL round-bottomed flask and MeCN was removed on rotary evaporator. The crude product was washed with $CHCl_3$ (3×40 mL) by centrifuge to remove the excess of $TBAPF_6$ and collected as a yellow/brown solid. The crude product was then purified using reversed-phase column chromatography (0.1% v/v TFA in water and 0.1% v/v TFA in MeCN) followed by counterion exchange with satd $KPF_6$ aqueous solution to afford the final product E-PR4·22$PF_6$ as a yellow solid (16 mg, 59%). $^1$H NMR (600 MHz, $CD_3CN$): δ 9.03-8.93 (m, 40H), 8.51-8.36 (m, 40H), 7.60-7.53 (m, 32H), 5.80-5.68 (m, 36H).

E-PR6·30$PF_6$: PR4·22$PF_6$ (11 mg, 1.34 μmol) and CBPQT·4$PF_6$ (28 mg, 0.025 mmol) were dissolved in MeCN (30 mL, 0.1 M $TBAPF_6$) in the working cell, while the auxiliary electrode chamber was filled with ferrocene dissolved in of MeCN (1 mL, 0.1 M $TBAPF_6$). The apparatus was subjected to one redox cycle at 40° C. with alternate constant potentials of-0.7 V (reduction potential vs Ag/AgCl) and +1.4 V (oxidation potential vs Ag/AgCl) for 10 min with resting periods of 20 and 10 min, respectively. After the redox cycle was complete, the solution in the working cell was transferred to a 250-mL round-bottomed flask and MeCN was removed on a rotary evaporator. The crude product was washed with $CHCl_3$ (3×40 mL) by centrifuge to remove the excess of $TBAPF_6$ and collected as a yellow/brown solid. The crude product was then purified using reversed-phase column chromatography (0.1% v/v TFA in water and 0.1% v/v TFA in MeCN) followed by counterion exchange with satd $KPF_6$ aqueous solution to afford the final product E-PR6·30$PF_6$ as a yellow solid (6.6 mg, 47%). $^1$H NMR (600 MHz, $C_2D_6CO$): δ 9.66-9.39 (m, 56H), 8.90-8.71 (m, 56H), 7.90-7.78 (m, 48H), 6.14-6.00 (m, 52H).

E-PR8·38$PF_6$: PR6·30$PF_6$ (15 mg, 1.44 μmol) and CBPQT·4$PF_6$ (32 mg, 0.029 mmol) were dissolved in MeCN (30 mL, 0.1 M $TBAPF_6$) in the working cell, while the auxiliary electrode chamber was filled with ferrocene dissolved in MeCN (1 mL, 0.1 M $TBAPF_6$). The apparatus was subjected to one redox cycle at 40° C. with alternate constant potentials of-0.7 V (reduction potential vs Ag/AgCl) and +1.4 V (oxidation potential vs Ag/AgCl) for 12 min with resting periods of 20 and 10 min, respectively. After the redox cycle was complete, the solution in the working cell was transferred to a 250-mL round-bottomed flask and MeCN was removed on a rotary evaporator. The crude product was washed with $CHCl_3$ (3×40 mL) by centrifuge to remove the excess of $TBAPF_6$ and collected as a yellow/brown solid. The crude product was then purified using reversed-phase column chromatography (0.1% v/v TFA in water and 0.1% v/v TFA in MeCN) followed by counterion exchange with satd $KPF_6$ aqueous solution to afford the final product E-PR8·38$PF_6$ as a yellow solid (15 mg, 83%). $^1$H NMR (600 MHz, $CD_3CN$); δ 9.15-8.76 (m, 72H), 8.56-7.93 (m, 76H), 7.79-7.54 (m, 63H), 5.95-5.56 (m, 73H).

E-PR10·46$PF_6$: PR8·38$PF_6$ (15 mg, 1.19 μmol) and CBPQT·4$PF_6$ (26 mg, 0.024 mmol) were dissolved in MeCN (30 mL, 0.1 M $TBAPF_6$) in the working cell, while the auxiliary electrode chamber was filled with ferrocene dissolved in MeCN (1 mL, 0.1 M $TBAPF_6$). The apparatus was subjected to one redox cycle at 40° C. with alternate constant potentials of-0.7 V (reduction potential vs Ag/AgCl) and +1.4 V (oxidation potential vs Ag/AgCl) for 12 min with resting periods of 20 and 10 min, respectively. After the redox cycle, the solution in the working cell was transferred to a 250-mL round-bottomed flask and MeCN was removed on a rotary evaporator. The crude product was washed with $CHCl_3$ (3×40 mL) by centrifuge to remove the excess of $TBAPF_6$ and collected as a yellow/brown solid. The crude product was then purified using reversed-phase column chromatography (0.1% v/v TFA in water and 0.1% v/v TFA in MeCN) followed by counterion exchange with satd $KPF_6$ aqueous solution to afford the final product E-PR10·46$PF_6$ as a yellow solid (7 mg, 39%). $^1$H NMR (600 MHz, $CD_3CN$): δ 9.19-8.79 (m, 88H), 8.59-7.86 (m, 99H), 7.80-7.54 (m, 81H), 5.94-5.61 (m, 91H).

The invention claimed is:

1. A threading component (TC) comprising a collecting chain (CC) and at least one artificial molecular pump (AMP) on the terminus of the TC, the artificial molecular pump comprising a Coulombic barrier (CB), a steric barrier (SB), and a recognition site (RS) between the CB and the SB, wherein the CC comprises a polyethylene glycol (PEG), a polystyrene (PS), a poly(methyl acrylate)(PMA), a poly (methyl methacrylate)(PMMA), a polylactide (PLA), or any combination thereof.

2. The threading component of claim 1 wherein the TC comprises two artificial molecular pumps.

3. The threading component of claim 2, wherein the TC comprises, in order, a first CB, a first RS, a first SB, the CC, a second SB, a second RS, and a second CB.

4. The threading component of claim 1, wherein— the RS comprises bipyridinium (BIPY), the CB comprises a dimethylpyridinium (PY), and the SB comprises isopropylphenylene (IPP).

5. The threading component of claim 4, wherein the RS comprises bipyridinium (BIPY), the CB comprises 2,6-dimethylpyridinium (PY), the SB comprises isopropylphenylene (IPP), and the CC comprises the PEG.

6. The threading component of claim 5, wherein the threading components comprises

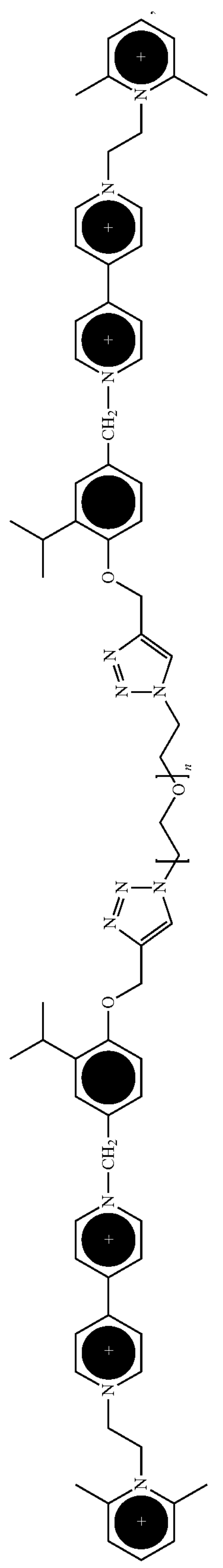

wherein n is an integer.

7. A polyrotaxane comprising the TC of claim 1 and further comprising at least two macrocyclic components.

8. The polyrotaxane of claim 7, wherein the polyrotaxane comprises at least 10 macrocyclic components.

9. The polyrotaxane of claim 7, wherein the macrocyclic components comprises cyclobis(paraquat-p-phenylene) (CBPQT).

10. The polyrotaxane of claim 7, wherein the TC comprises two artificial molecular pumps.

11. A method of preparing a polyrotaxane, the method comprising:

providing the threading component (TC) according to claim 1, providing a macrocyclic component (MC), reducing the TC and/or the MC, threading the MC onto the TC, oxidizing the TC and/or MC, and collecting the MC onto the CC, and repeating steps (c)-(f) m redox cycles, where m is an integer greater than or equal to 1.

12. The method of claim 11, wherein the m+1 redox cycles are performed in a one-pot method.

13. The method of claim 11, wherein the reducing step (c) comprises adding a reducing agent and/or the oxidizing step (e) comprises adding an oxidizing agent.

14. The method of claim 13, wherein the reducing agent is bis(cyclopentadienyl) cobalt (II) or zinc powder and/or the oxidizing agent is $NOPF_6$, oxygen, or $Ag_2SO_4$.

15. The method of claim 11, wherein the reducing step (c) comprises applying a reducing potential and/or the oxidizing step (e) comprises applying an oxidizing potential.

16. The method of claim 15, wherein the reducing potential is −0.7±0.1 V vs Ag/AgCl and/or the oxidizing potential is +1.4±0.1 V vs Ag/AgCl.

17. The method of claim 11, wherein the TC comprises two artificial molecular pumps.

18. The method of claim 11, wherein the TC comprises two artificial molecular pumps and at least 2 MCs are threaded and collected each of the m+1 redox cycles.

19. The method of claim 11, wherein m is at least 4.

20. The method of claim 19, wherein the macrocyclic components comprises cyclobis(paraquat-p-phenylene) (CBPQT).

* * * * *